US009491570B2

(12) United States Patent
Nishimura et al.

(10) Patent No.: US 9,491,570 B2
(45) Date of Patent: Nov. 8, 2016

(54) ELECTRONIC DEVICE, CONTROL METHOD, AND CONTROL PROGRAM

(71) Applicant: KYOCERA Corporation, Kyoto-shi, Kyoto (JP)

(72) Inventors: Yasuhiko Nishimura, Yokohama (JP); Takefumi Kondou, Yokohama (JP); Haruyoshi Oshinome, Yokohama (JP); Nozomi Yokota, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/695,518

(22) Filed: Apr. 24, 2015

(65) Prior Publication Data

US 2015/0230047 A1    Aug. 13, 2015

Related U.S. Application Data

(63) Continuation-in-part of application No. PCT/JP2013/079019, filed on Oct. 25, 2013.

(30) Foreign Application Priority Data

| Oct. 25, 2012 | (JP) | 2012-236093 |
| Oct. 25, 2012 | (JP) | 2012-236097 |
| Oct. 25, 2012 | (JP) | 2012-236098 |

(51) Int. Cl.
*H04B 7/00* (2006.01)
*H04M 1/00* (2006.01)
(Continued)

(52) U.S. Cl.
CPC ........... *H04W 4/008* (2013.01); *H04M 1/7253* (2013.01); *H04M 1/72519* (2013.01); *H04W 4/20* (2013.01); *H04M 2250/02* (2013.01); *H04W 76/023* (2013.01); *H04W 84/20* (2013.01)

(58) Field of Classification Search
CPC . H04W 4/008; H04W 76/023; H04W 84/18; H04W 84/20
USPC ........ 455/41.2–41.3, 507, 517, 552.1–553.1, 455/566
See application file for complete search history.

(56) References Cited

U.S. PATENT DOCUMENTS

| 7,164,887 B2 * | 1/2007 | Tanada ................... H04W 84/20 455/343.2 |
| 8,959,170 B2 * | 2/2015 | Miyabayashi ........ H04W 84/20 709/209 |

(Continued)

FOREIGN PATENT DOCUMENTS

| JP | 2002-101166 A | 4/2002 |
| JP | 2002-117874 A | 4/2002 |

(Continued)

OTHER PUBLICATIONS

International Search Report mailed Jan. 28, 2014 in corresponding International Application No. PCTJP2013/079019.
Office Action in JP Application No. 2012-236093, mailed Jun. 28, 2016.

(Continued)

*Primary Examiner* — Simon Nguyen
(74) *Attorney, Agent, or Firm* — Hauptman Ham, LLP

(57) ABSTRACT

According to one of aspects, an electronic device includes a connecting module, and a controller. The connecting module is configured to wirelessly connect to a second device. The controller is configured to cause the connecting module to wirelessly connect to the second device in a first mode or in a second mode. In the first mode, the second device connects slavery to the electronic device. In the second mode, the electronic device connects slavery to the second device.

13 Claims, 19 Drawing Sheets

(51) Int. Cl.
*H04W 4/00* (2009.01)
*H04M 1/725* (2006.01)
*H04W 4/20* (2009.01)
*H04W 76/02* (2009.01)
*H04W 84/20* (2009.01)

(56) References Cited

U.S. PATENT DOCUMENTS

| | | | | |
|---|---|---|---|---|
| 2004/0203373 A1* | 10/2004 | Ogino | .................. | H04W 84/20 455/41.2 |
| 2004/0203936 A1* | 10/2004 | Ogino | ............... | H04M 1/72513 455/463 |
| 2006/0194609 A1* | 8/2006 | Matsuo | ............... | H04M 1/6066 455/552.1 |

FOREIGN PATENT DOCUMENTS

| | | |
|---|---|---|
| JP | 2003-134224 A | 5/2003 |
| JP | 2005-33635 A | 2/2005 |
| JP | 2007-81498 A | 3/2007 |
| JP | 2007-150766 A | 6/2007 |
| JP | 2009-89024 A | 4/2009 |
| JP | 2012-80333 A | 4/2012 |
| JP | 2012-199640 A | 10/2012 |
| JP | 2012-199663 A | 10/2012 |

OTHER PUBLICATIONS

Office Action in JP Application No. 2012-236097, mailed Jun. 28, 2016.
Office Action in JP Application No. 2012-236098, mailed Jun. 28, 2016.

* cited by examiner

| Mode | Registered Device | Type | Status |
|---|---|---|---|
| Master | 20B(00:11:22:AA:BB:CC) | TP1 | Connected |

FIG.14

| Mode | Registered Device Information | Type | Status | PROFILES |
|---|---|---|---|---|
| Master | 20B(00:11:22:AA:BB:CC) | TP1 | Connected | HSP HFP |
| N/A | Registered Device 2 | TP2 | Unconnected | HSP HFP PBAP |

| Mode | Registered Device Information | Type | Status | PROFILES |
|---|---|---|---|---|
| Slave | 20A(99:88:77:XX:YY:ZZ) | TP1 | Connected | HSP |
| N/A | Registered Device 3 | TP3 | Unconnected | HFP |

9B

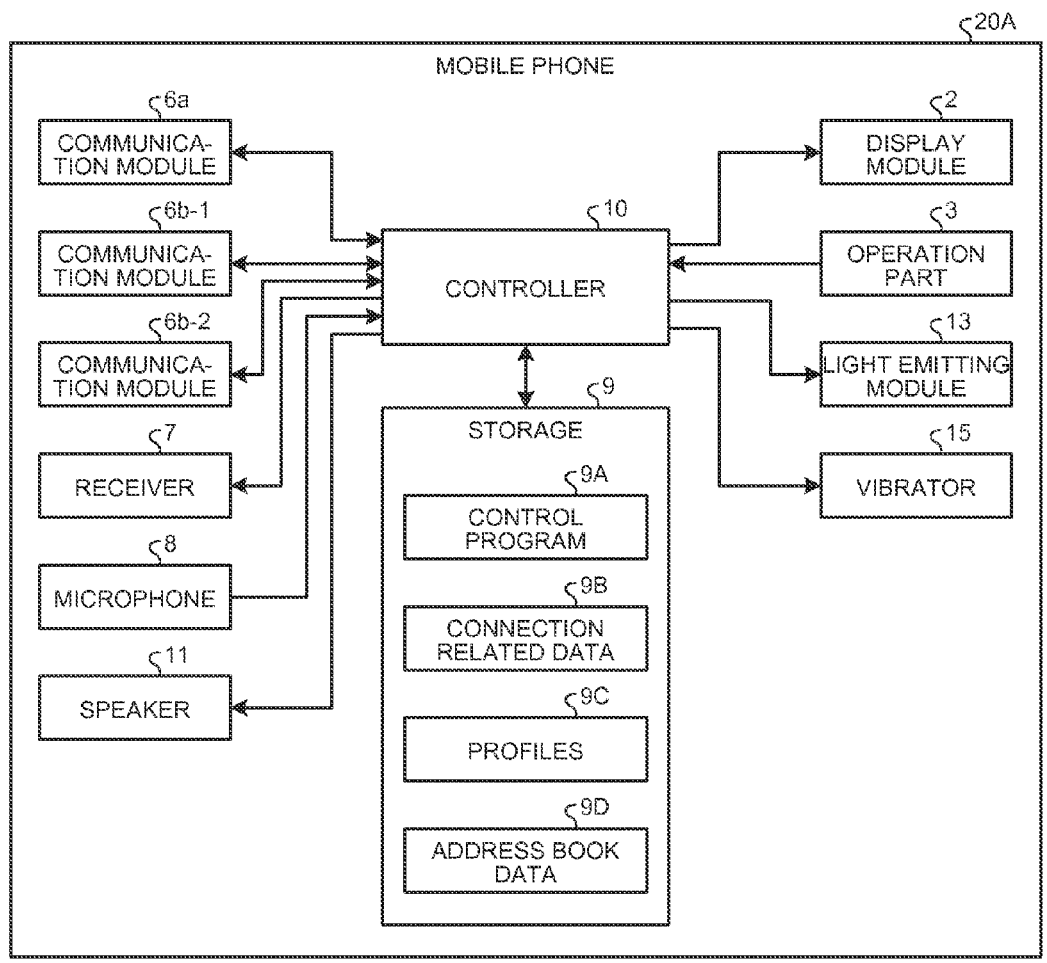

FIG.23

| Mode | Registered Device | Type | Status |
|---|---|---|---|
| Master | 20B(00:11:22:AA:BB:CC) | TP1 | Connected |
| Master | 20C(01:12:23:AB:BC:CD) | TP1 | Connected |

| Mode | Registered Device | Type | Status |
|---|---|---|---|
| Slave | 20B(00:11:22:AA:BB:CC) | TP1 | Connected |
| Slave | 20C(01:12:23:AB:BC:CD) | TP1 | Connected |

9B

ELECTRONIC DEVICE, CONTROL METHOD, AND CONTROL PROGRAM

CROSS-REFERENCE TO RELATED APPLICATION

This application is a Continuation-in-Part of PCT international application Ser. No. PCT/JP2013/079019 filed on Oct. 25, 2013 which designates the United States, incorporated herein by reference, and which is based upon and claims the benefit of priority from Japanese Patent Applications No. 2012-236093, No. 2012-236097, and No. 2012-236098 filed on Oct. 25, 2012, the entire contents of which are incorporated herein by reference.

FIELD

This application relates to an electronic device, a control method, and a control program.

BACKGROUND

Some electronic devices, such as mobile phones, smartphones, and tablets, have a function for realizing data communication with other electronic devices wirelessly connected thereto. For example, a mobile phone having this function is able to perform short distance wireless data communication with use of a headset by executing a pairing process with the headset, which has a short distance wireless function. An electronic device that performs data communication after performing a pairing process is described in, for example, Japanese Patent Application Publication No. 2003-134224.

SUMMARY

According to one of aspects, an electronic device includes: a connecting module, and a controller. The connecting module is configured to wirelessly connect to a second device. The controller is configured to cause the connecting module to wirelessly connect with the second device in a first mode or in a second mode. In the first mode, the connecting module is configured to connect as a master with the second device. In the second mode, the connecting module is configured to connect as a slave with the second device.

According to one of aspects, a control method is of controlling an electronic device having a connecting module configured to wirelessly connect to a second device. The control method includes: causing the connecting module to wirelessly connect to the second device in a first mode or in a second mode. In the first mode, the connecting module is configured to wirelessly connect as a master to the second device. In the second mode, the connecting module is configured to connect as a slave to the second device.

According to one of aspects, a control program operable to cause an electronic device including a connecting module configured to wirelessly connect to a second device to execute causing the connecting module to wirelessly connect to the second device in a first mode or in a second mode. In the first mode, the connecting module is configured to connect as a master to the second device. In the second mode, the connecting module is configured to connect as a slave to the second device.

BRIEF DESCRIPTION OF DRAWINGS

FIG. 12 is a flow chart illustrating one of examples of a switch-over sequence of when the Bluetooth (registered trademark) function is ON.

FIG. 14 is a diagram illustrating one of examples of connectional data according to an embodiment.

FIG. 15 is a diagram illustrating one of examples of the connectional data according to an embodiment.

FIG. 21 is a block diagram illustrating one of examples of a functional configuration of a mobile phone according to one of embodiments.

FIG. 22 is a diagram illustrating one of examples of information related to connection of the mobile phone according to one of embodiments with another electronic device.

FIG. 23 is a diagram illustrating one of examples of information related to connection of the mobile phone according to one of embodiments with another electronic device.

FIG. 24 is a diagram illustrating one of examples of information related to connection of the mobile phone according to one of embodiments with another electronic device.

REFERENCE SIGNS LIST

2 DISPLAY MODULE
3 OPERATION PART
6a COMMUNICATION MODULE
6b, 6b-1, 6b-2 COMMUNICATION MODULE
7 RECEIVER
8 MICROPHONE
9 STORAGE
9A CONTROL PROGRAM
9B CONNECTIONAL DATA
9C PROFILES
9D ADDRESS BOOK DATA
10 CONTROLLER
11 SPEAKER
13 LIGHT EMITTING MODULE
15 VIBRATOR
20A MOBILE PHONE
20B MOBILE PHONE
30 MOBILE PHONE
30a MOBILE PHONE
30b MOBILE PHONE
90, 100 PUBLIC LINE NETWORK
91a, 91b, 101a, 101b BASE STATION

DESCRIPTION OF EMBODIMENTS

Embodiments for implementing an electronic device, a control method, and a control program according to this application will be described in detail with reference to the drawings. Hereinafter, a mobile phone will be described as one of examples of the electronic device.

Figure 1:
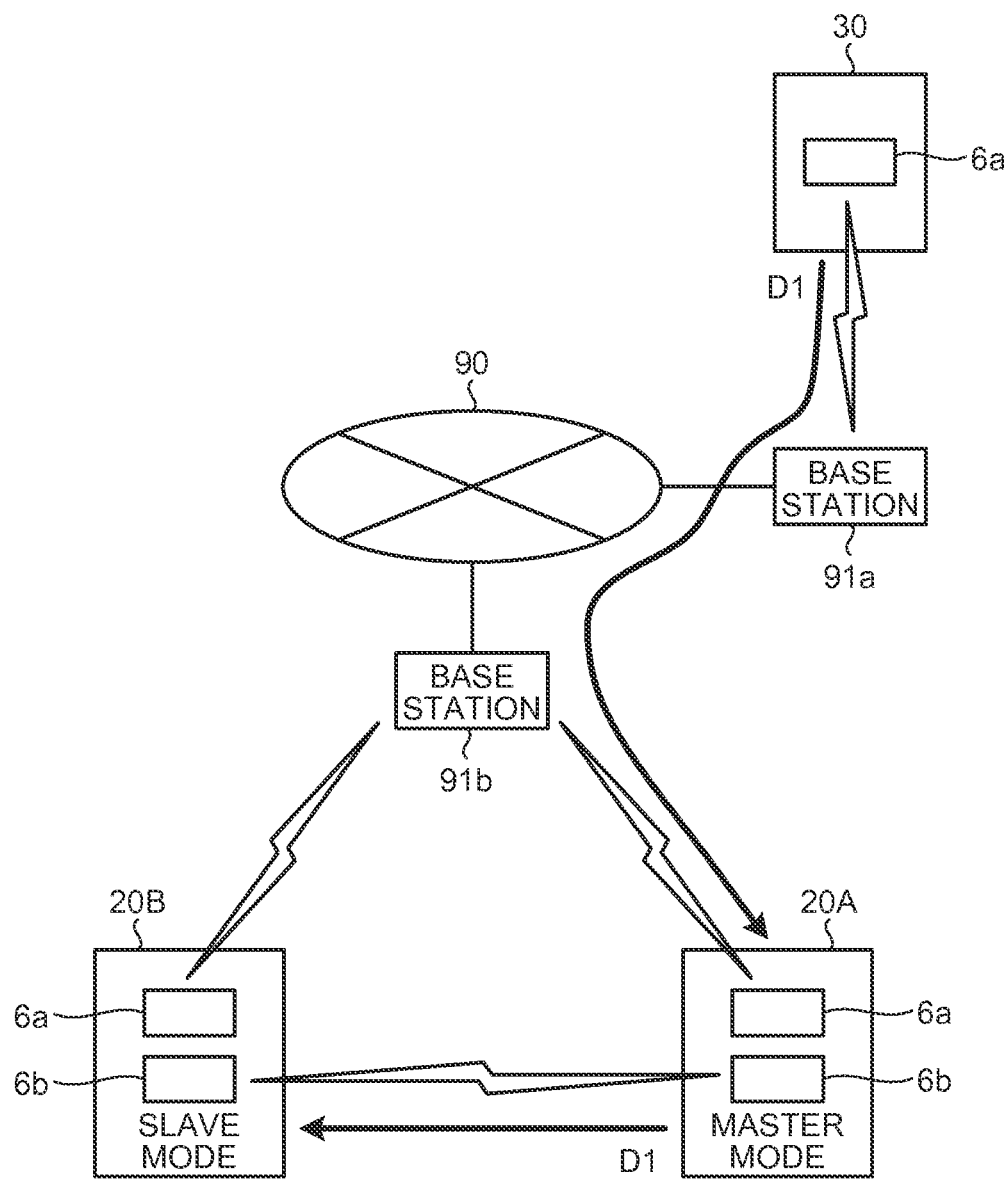
FIG. 1 is a diagram illustrating one of examples of a notification about an incoming call.

With reference to FIG. 1 to FIG. 4, various control methods by a mobile phone according to an embodiment will be described. FIG. 1 is a diagram illustrating one of examples of a notification about an incoming call. Mobile phones 20A, 20B, and 30 illustrated in FIG. 1 each have a communication module 6a. The mobile phones 20A and 20B each further have a communication module 6b.

The communication module 6a is configured to call through a public line network 90. In a setting illustrated in FIG. 1, the communication modules 6a of the mobile phones 20A and 20B are connected to the public line (includes carrier line) network 90 via wireless communication with a base station 91b. In a setting illustrated in FIG. 1, the communication module 6a of the mobile phone 30 is connected to the public line network 90 via wireless communication with a base station 91a.

The communication module 6b is configured to call through short distance wireless communication, such as of Bluetooth (registered trademark). In a setting illustrated in FIG. 1, the communication modules 6b of the mobile phones 20A and 20B are wirelessly connected in a state communicatable with each other. In an example illustrated in FIG. 1, the mobile phone 20A causes the communication module 6b to wirelessly connect to the mobile phone 20B in a first mode (hereinafter, "master mode") of causing another electronic device to slavery connect thereto. In an example illustrated in FIG. 1, the mobile phone 20B causes the communication module 6b to wirelessly connect to the mobile phone 20A in a second mode (hereinafter, "slave mode") of slavery connecting to another electronic device.

The mobile phones 20A and 20B are owned, for example, by the same user. When the mobile phone 20A detects an incoming call, the mobile phone 20A can notify the incoming call to the mobile phone 20B via short distance wireless communication by the communication module 6b.

As illustrated in FIG. 1, for example, when the mobile phone 30 originates a call to the mobile phone 20A, this originated call reaches the mobile phone 20A via the base station 91a, the public line network 90, and the base station 91b. When the mobile phone detects an incoming call, the mobile phone 20A can notify the incoming call to the mobile phone 20B connected thereto via short distance wireless communication by the communication module 6b. When the mobile phone 20A notifies the incoming call, the mobile phone 20B can inform the incoming call to the user with a ringtone, vibration, blinking of a lamp, and/or the like.

When the user, who has notified the incoming call, operates a off-hook operation on the mobile phone 20A or 20B, a call between the mobile phone 20A and mobile phone 30 is started. The off-hook operation is an operation for starting a call in response to an incoming call. During the call responded by the operation on the mobile phone 20B between the mobile phone 20A and mobile phone 30, the mobile phone 20A can relay exchange of voice data D1 between the mobile phone 20B and mobile phone 30. When any one of the mobile phones 20A, 20B, and 30 disconnects the call, the mobile phone 20A can end the relay of the exchange of the voice data D1 between the mobile phone 20B and mobile phone 30.

When the mobile phone detects an incoming call which is originated by specifying a telephone number assigned to the mobile phone 20B itself, the mobile phone 20B also informs the incoming call to the user with a ringtone, vibration, blinking of a lamp, and/or the like. When the user, who has notified the incoming call, operates a off-hook operation, a call between the mobile phone 20B and an electronic device (for example, a mobile phone other than the mobile phone 30), which has originated the call, is started. In this case, voice data exchanged between the mobile phone 20B and the electronic device that has originated the call are not relayed by the mobile phone 20A, to which the mobile phone 20B is connected.

As described above, when the mobile phone 20A and mobile phone 20B are connected in a state communicatable with each other, the mobile phone 20B in the slave mode is notified of an incoming call to the mobile phone 20A in the master mode. Therefore, when the mobile phones 20A and 20B are owned by the same user, the user can respond to incoming calls to the mobile phones 20A and 20B by using only the mobile phone 20B.

Figure 2:
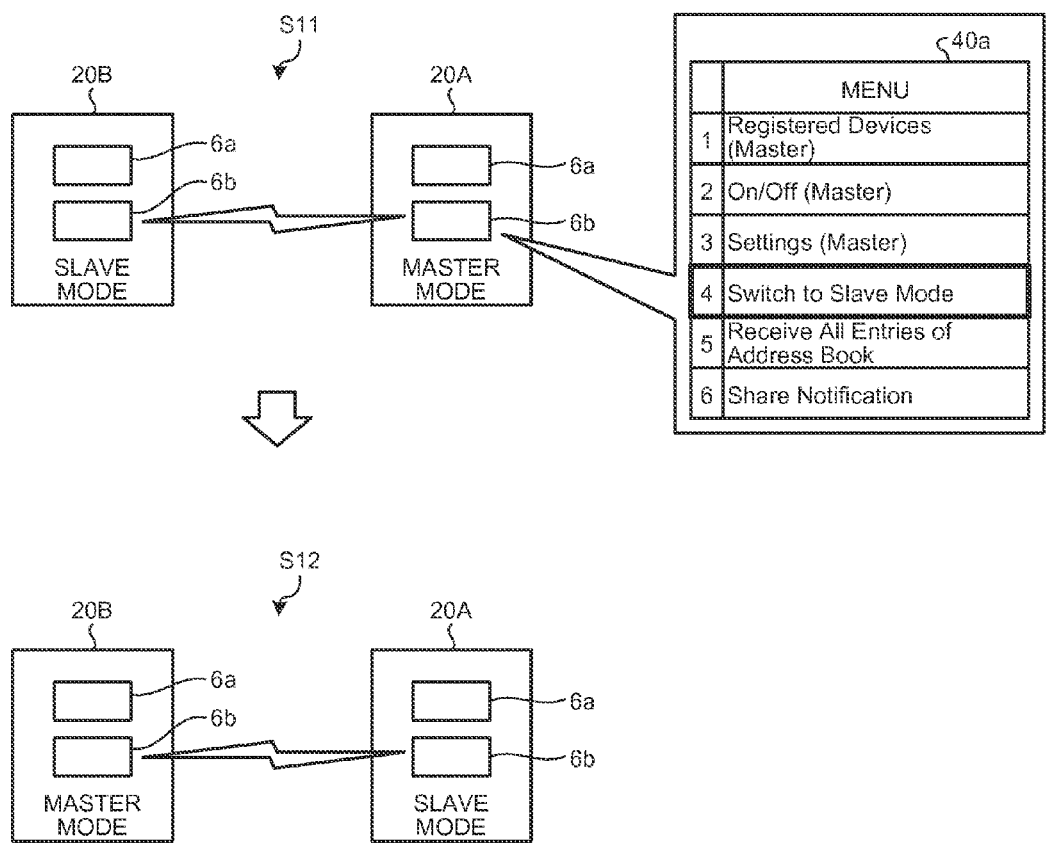
FIG. 2 is a diagram illustrating one of examples of a switch-over of modes.
Figure 3:
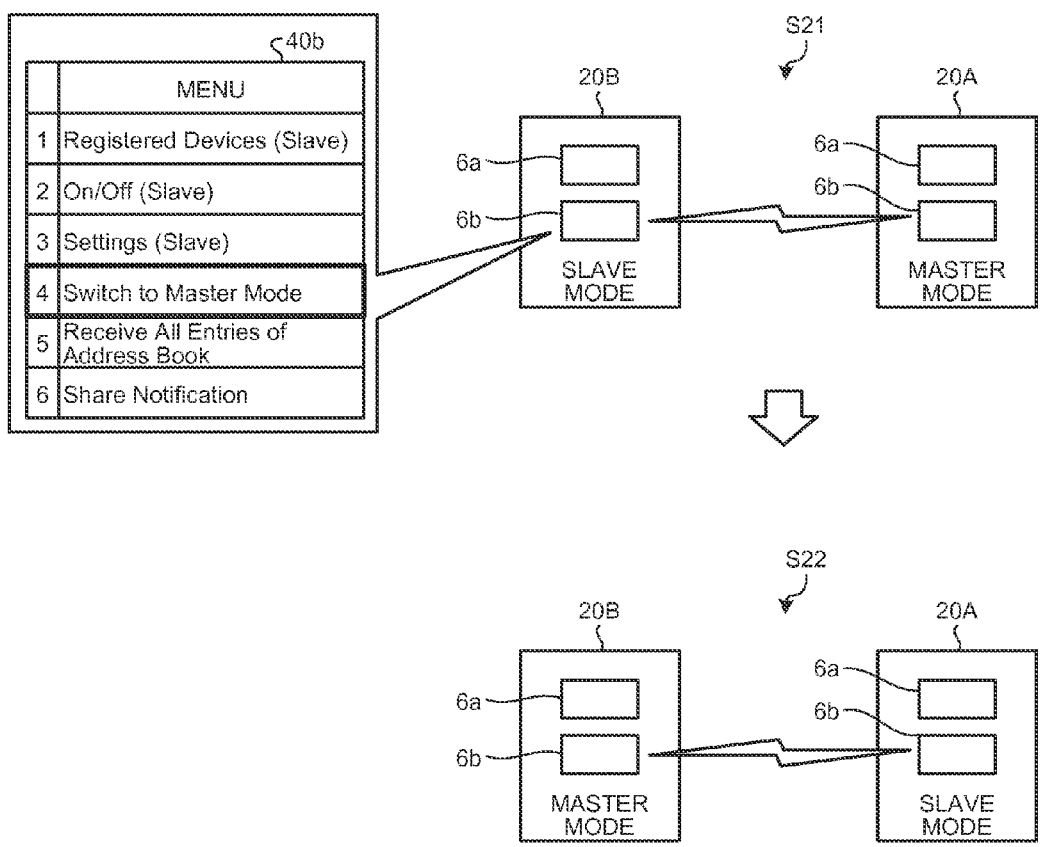
FIG. 3 is a diagram illustrating one of examples of the switch-over of modes.

FIG. 2 and FIG. 3 are diagrams illustrating one of examples of a switch-over of modes. As illustrated in FIG. 2, the mobile phone 20A can cause a display module 2 to display a menu screen 40a, which is for operating the communication module 6b (Step S11). When an operation for switching over to the slave mode is selected on the menu screen 40a, the mobile phone 20A can switch the mode of itself from the master mode to the slave mode (Step S12). As illustrated in FIG. 3, in the mobile phone 20B also, control similar to that in the mobile phone 20A illustrated in FIG. 2 is executed. As illustrated in FIG. 3, the mobile phone 20B can cause a display to display a menu screen 40b, which is for operating the communication module 6b (Step S21). When an operation for switching over to the master mode is selected on the menu screen 40b, the mobile phone 20B can switch the mode of itself from the slave mode to the master mode (Step S22). When the both controls illustrated in both of FIG. 2 and FIG. 3 are completed, the switch-over of modes being set in the mobile phone 20A and mobile phone 20B is completed.

Figure 4:
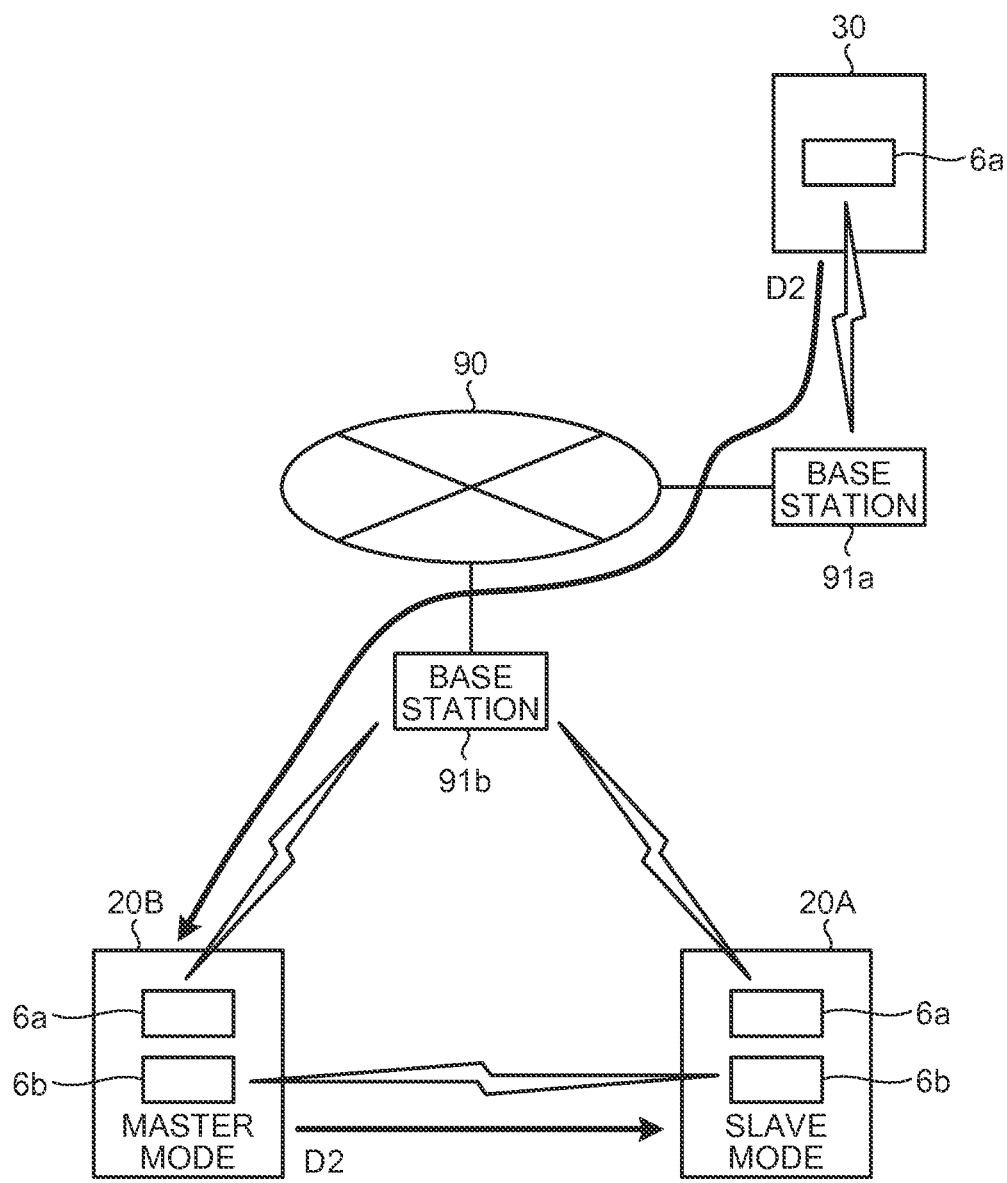
FIG. 4 is a diagram illustrating one of examples of a notification about an incoming call after a switch-over of modes.

FIG. 4 is a diagram illustrating one of examples of a notification about an incoming call after a switch-over of modes. As illustrated in FIG. 4, the mobile phone 20A can be set in the slave mode. The mobile phone 20A can cause the communication module 6b to wirelessly connect, in the slave mode, to the mobile phone 20B. As illustrated in FIG. 4, the mobile phone 20B can be set in the master mode. The mobile phone 20B can cause the communication module 6b to wirelessly connect, in the master mode, to the mobile phone 20A.

When detecting an incoming call, the mobile phone 20B can notify the incoming call to the mobile phone 20A via short distance wireless communication by the communication module 6b.

In an example illustrated in FIG. 4, when the mobile phone 30 originates a call to the mobile phone 20B, this originated call reaches the mobile phone 20B via the base station 91a, the public line network 90, and the base station 91b. When the mobile phone 20B detects an incoming call, the mobile phone 20B can notify the incoming call to the mobile phone 20A, which connected thereto, via short distance wireless communication by the communication module 6b. When the incoming call is notified from the mobile phone 20B, the mobile phone 20A can inform the incoming call to the user with a ringtone, vibration, blinking of a lamp, and/or the like.

When the off-hook operation is performed by the user, who has noticed the information, on the mobile phone 20A or 20B, a call between the mobile phone 20B and mobile phone 30 is started. In the other word, the mobile phone 20B and mobile phone 30B starts the call in response to the off-hook operation on the mobile phone 20A or 20B by the user. During the call responded to the off-hook operation on the mobile phone 20A, the mobile phone 20B can relay exchange of voice data D2 between the mobile phone 20A and mobile phone 30. When the call is disconnected by any one of the mobile phones 20A, 20B, and 30, the mobile phone 20B can end the relay of the exchange of the voice data D2 between the mobile phone 20A and mobile phone 30.

In an example illustrated in FIG. 1, during the mobile phone 20B is set in the slave mode and the mobile phone 20A is set in the master mode, the mobile phone 20A can notify to the mobile phone 20B of the incoming call to the mobile phone 20A. In contrast, in an example illustrated in FIG. 4, during the mobile phone 20A is set in the slave mode and the mobile phone 20B is set in the master mode, the mobile phone 20B can notify to the mobile phone 20A of the incoming call to the mobile phone 20B. As described above, the user is able to flexibly change which of the mobile phone 20A and mobile phone 20B is to be used in the master mode or slave mode. And thus flexibility is able to be improved in a manner of use thereof.

Figures 5, 6:
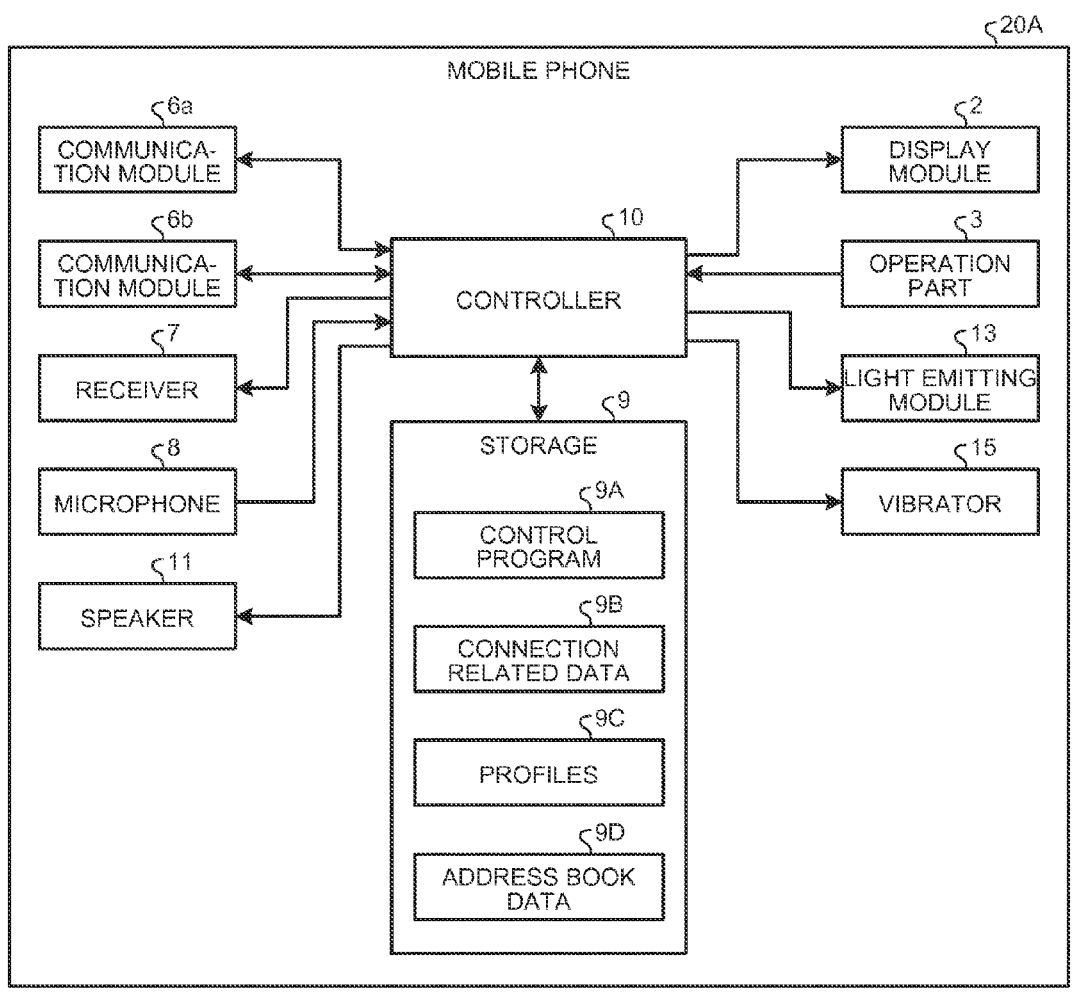
FIG. 5 is a block diagram illustrating one of examples of a functional configuration of a mobile phone according to an embodiment.
FIG. 6 is a diagram illustrating one of examples of connectional data according to an embodiment.

With reference to FIG. 5, functional configurations of the mobile phones according to an embodiment will be described. Since the mobile phone 20A and mobile phone 20B can have functionally the same configuration. Hereinafter, functional configuration of the mobile phone 20A will be described. FIG. 5 is a block diagram illustrating one of examples of a functional configuration of the mobile phone according to an embodiment. In the following description, the same signs may be assigned to the similar components. Furthermore, redundant description may not be repeated.

As illustrated in FIG. 5, the mobile phone 20A may include the display module 2, an operation part 3, the communication modules 6a and 6B, a receiver 7, a microphone 8, a storage 9, a controller 10, a speaker 11, a light emitting module 13, and a vibrator 15.

The display module 2 may include a display panel, such as a liquid crystal display, an organic electro-luminescence (EL) display, or the like. The display module 2 can display information, such as characters, graphics, images, and the like, according to signals input from the controller 10. The information, displayed by the display module 2, includes a screen for informing, the menu screens 40a and 40b, icons, and the like.

The operation part 3 may include a device or a plurality of devices, for receiving operations by a user. Examples of the device for receiving the operations by a user may include, but are not limited to, one or more keys, one or more buttons, one or more touch screens, etc. The operation part 3 can input signals corresponding to a received operation into the controller 10. The controller 10 can receive the operation by a user via the operation part 3.

The communication module 6a can communicate using a communication standard of 2G, 3G, 4G, or the like for communicating via the public line network 90. Examples of a communication standard for communicating via the public line network 90 include, but are not limited to, Long Term Evolution (LTE), Wideband Code Division Multiple Access (W-CDMA), Code Division Multiple Access 2000 (CDMA 2000), Personal Digital Cellular (PDC), Global System for Mobile Communications (GSM (registered trademark)), Personal Handy-phone System (PHS), etc. The communication system may include a communication standard for communicating data files via the public line network 90, such as Worldwide Interoperability for Microwave Access (WiMAX). When the communication module 6a uses the communication standard for communicating data files, a call is realized by combining a technique for data transmission and a technique for transmitting voice, such as Voice over Internet Protocol (VoIP). The communication module 6a can support one or more communication standards for communicating via the public line network 90.

The communication module 6b can communicate using short distance wireless communication system. The communication module 6b can wirelessly connect to another electronic device. Another electronic device can wirelessly connect to the communication module 6b. Any one of the communication module 6b and another electronic device can request a connection between the communication module 6b and another electronic device. Examples of the short distance wireless communication system may include, but are not limited to, Bluetooth (registered trademark), wireless LAN (IEEE 802.11), ZigBee (registered trademark), infrared communication, visible light communication, Near Field Communication (NFC), etc. The communication module 6b can support one or more short distance wireless communication systems for communicating. The communication module 6b may communicate with another electronic device directly.

The receiver 7 and the speaker 11 may include a sound output module. The receiver 7 and the speaker 11 can output sound signals input from the controller 10 as sounds. The receiver 7 may be used for outputting a voice of a person on the other phone upon a call, for example. The speaker 11 may be used for outputting a ringtone and music, for example. One of the receiver 7 and the speaker 11 may also have a function of the other. The microphone 8 may include a sound input module. The microphone 8 can convert a voice or the like of a user to sound signals. the microphone 8 can input the converted sound signals to the controller 10.

The storage 9 can store therein computer programs and data. The storage 9 may be also used as a work area where a result of processing by the controller 10 is temporarily stored. The storage 9 may include any non-transitory storage media, such as a semiconductor storage medium and a magnetic storage medium. The storage 9 may include various types of storage media. The storage 9 may include a combination of: a portable storage medium, such as a memory card, an optical disk, or a magneto-optical disk; and a storage medium reading device. The storage 9 may include a storage device used as a temporary storage area, such as a random access memory (RAM).

The storage 9 can store therein a control program 9A, connectional data 9B, one or more profiles 9C, and address book data 9D.

The control program 9A can provide a function for wirelessly connecting the communication module 6b to another electronic device in one of the master mode and the second mode. During the communication module 6b is set in the master mode, another electronic device can slavery connect to the communication module 6b. During the communication module 6b is set in the slave mode, the communication module 6b can slavery connect to another electronic device. The control program 9A can provide a function for switching over between the master mode and slave mode. The control program 9A can provide a notifying function for controlling notification of an incoming call in an electronic device in the master mode.

The connectional data 9B may include information related to connection with other electronic devices. The profiles 9C may include one or more standardized protocols. The standardized protocols may be used when data communication with a connected electronic device is performed. The profiles 9C include some protocols according to characteristics of the electronic device. The address book data 9D may include various information related other partners to be communicated with and/or to be called to.

FIG. 6 is a diagram illustrating one of examples of the connectional data 9B according to an embodiment. As illustrated in FIG. 6, the connectional data 9B may include mode information of own mode, device information, type information, and status information. The device information may be used for identifying one or more electronic devices to be connected to. An electronic device, which is included in the device information, may be called registered device. The type information may be used for identifying a connectional type of the registered device. The status information may be used for identifying a connection state with another electronic device. As the mode information, a value corresponding to either of "master", "slave", or "n/a" may be entered. As the device information, a value uniquely given to the electronic device to be connected to, such as a manufacturing number or a MAC address, may be entered. As the type, a combination of characters uniquely given to the connected electronic device may be entered. "TP1", for example, may correspond to a mobile phone. As the status information, a value corresponding to "connected" or "unconnected" may be entered.

The controller 10 may included one or more processing modules. For example, the processing modules may include, but are not limited to, a central processing unit (CPU), a system-on-a chip (SoC), a micro control unit (MCU), a Field-Programmable Gate Array (FPGA), etc. The controller 10 can integrally control operations of the mobile phone 20A. The controller 10 can realize various functions using one or more of the control program 9A, the connectional data 9B, the profiles 9C, and the address book data 9D.

Specifically, the controller 10 can execute instructions. The program, stored in the storage 9, includes the instructions. The controller 10 can refer to the data, stored in the storage 9, as necessary. The controller 10 can control functional modules according to the data and instructions, and realizes various functions thereby. For example, the functional modules may include, but are not limited to, the display module 2, the communication modules 6a and 6b, the receiver 7, the speaker 11, the light emitting module 13, the vibrator 15, etc. The controller 10 may change the control according to a result of detection by a detecting module. Examples of the detecting module include, but are not limited to, the operation part 3, the communication modules 6a and 6b, the microphone 8, etc.

The controller 10 can execute processes corresponding to the various control methods illustrated in FIG. 1 to FIG. 4 by executing the control program 9A.

When the communication module 6b in the master mode is caused to be wirelessly connected to another electronic device, for example, the controller 10 controls operations of the communication module 6b such that the communication module 6b is wirelessly connected, in the master mode, to that electronic device. When the communication module 6b is wirelessly connected, in the master mode, to another electronic device, the controller 10 notifies the mobile phone 20B of an incoming call via short distance wireless communication by the communication module 6b. When the communication module 6b is caused to be wirelessly connected, in the salve mode, to another electronic device, for example, the controller 10 controls operations of the communication module 6b such that the communication module 6b is wirelessly connected, in the slave mode, to that electronic device. When the communication module 6b is wirelessly connected, in the salve mode, to another electronic device, the controller 10 informs the user of an incoming call with a ringtone, vibration, blinking of a lamp, and/or the like.

When a mode switch-over operation is detected, the controller 10 stops the operation of the communication module 6b if the communication module 6b is in operation, and then performs a switch-over of modes and initializes the communication module 6b. When the communication module 6b is in Bluetooth (registered trademark) connection, for example, the controller 10 disconnects the Bluetooth connection, turns the Bluetooth function OFF, and thereafter performs a switch-over of modes. Subsequently, when an operation of turning the Bluetooth function ON in the mode after the switch-over is detected, the controller 10 initializes the Bluetooth module. When the Bluetooth function is ON in the communication module 6b, for example, the controller 10 turns the Bluetooth function OFF, and thereafter performs a switch-over of modes. Subsequently, when an operation of turning the Bluetooth function ON in the mode after the switch-over is detected, the controller 10 initializes the Bluetooth module. When the controller 10 performs a switch-over of modes, the controller 10 updates the value of the own mode of the connectional data 9B stored in the storage 9. Examples of states in which the Bluetooth function is ON include a state where another electronic device is not wirelessly connected to the communication module 6b. Examples of states in which the Bluetooth function is OFF include a state where the Bluetooth function has been stopped, or a state where power has not been applied to the communication module 6b.

The light emitting module 13 emits light in a set color and pattern. The light emitting module 13 has a light source, such as a light emitting diode (LED), and is installed in the mobile phone 20A such that light emitted by the light source is visible from outside. The vibrator 15 vibrates the mobile phone 20A. The vibrator 15 uses, for example, a piezoelectric element or an eccentric motor, in order to vibrate the mobile phone 20A. The display module 2, the speaker 11, the light emitting module 13, and the vibrator 15 are used for informing a user of an incoming call of a telephone, mail reception, coming of a time registered in a schedule, and the like.

The functional configuration of the mobile phone 20A is exemplarily illustrated in FIG. 5. The functional configuration and configuration of the mobile phone 20A are modifiable. Thus the functional configuration and configuration of the mobile phone 20A are not limited in above embodiments.

Figure 7:
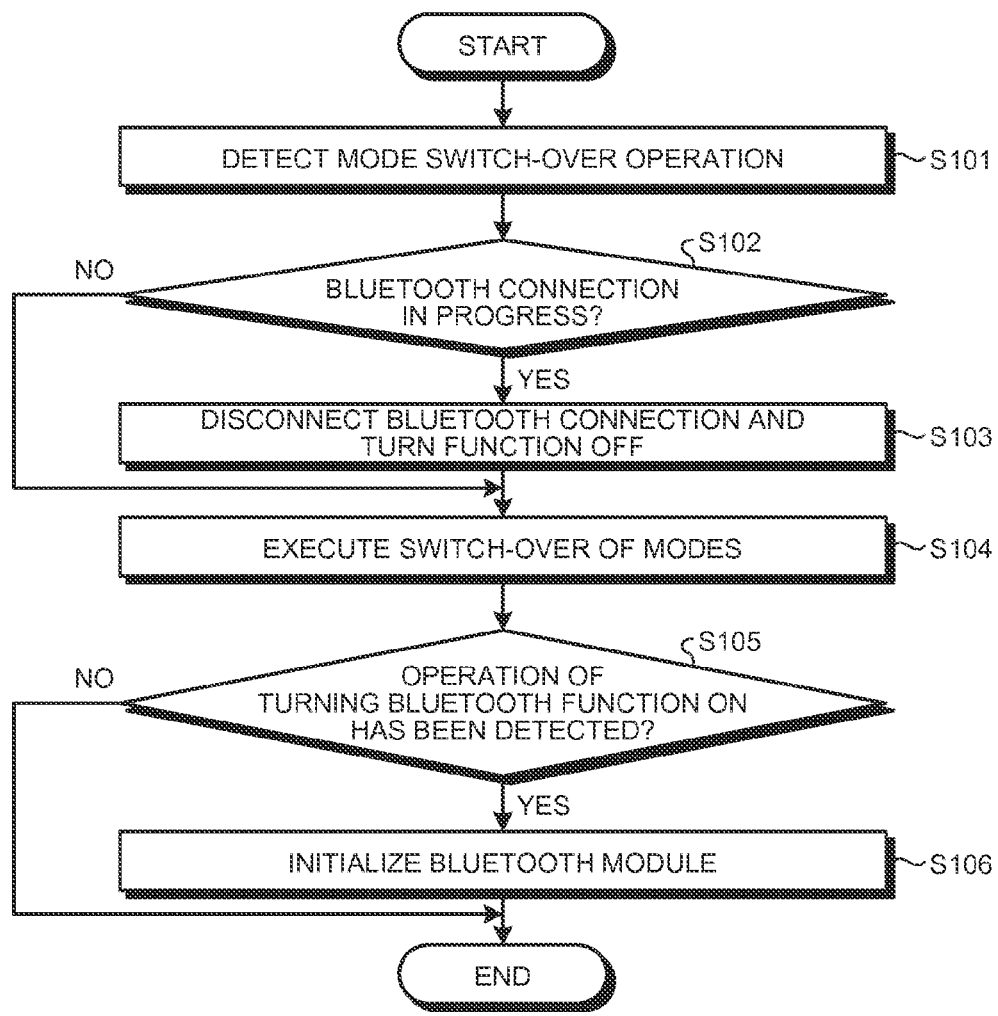
FIG. 7 is a flow chart illustrating a mode switch-over sequence executed by the mobile phone according to an embodiment.

By using FIG. 7, one of examples of a procedural sequence executed by the mobile phone according to an embodiment will be described. FIG. 7 is a flow chart illustrating one of examples of a mode switch-over sequence executed by the mobile phone according to an embodiment. The sequence illustrated in FIG. 7 is realized by the controller 10 executing the control program 9A and the like stored in the storage 9. Both of a switch-over from the master mode to the slave mode and a switch-over from the slave mode to the master mode are executed by the sequence illustrated in FIG. 7.

As illustrated in FIG. 7, when a mode switch-over operation on a menu screen (see FIG. 2 or FIG. 3), which the display module 2 is caused to display, is detected (Step S101), the controller 10 determines whether the communication module 6b is in Bluetooth (registered trademark) connection (Step S102).

When, as a result of the determination, the Bluetooth connection is ongoing (Yes at Step S102), the controller 10 disconnects the Bluetooth connection and turns the Bluetooth function OFF (Step S103). Subsequently, the controller 10 executes a switch-over of modes (master mode→slave mode, or slave mode→master mode) (Step S104).

In contrast, when, as a result of the determination, the Bluetooth connection is not ongoing (No at Step S102), the controller 10 directly proceeds to procedure of Step S104 and executes a switch-over of modes.

Subsequently, the controller 10 determines whether an operation of turning the Bluetooth function ON has been detected in the mode after the switch-over on the menu screen (see FIG. 2 or FIG. 3), which the display module 2 is caused to display (Step S105).

When, as a result of the determination, an operation of turning the Bluetooth function ON has been detected (Yes at Step S105), the controller 10 initializes the Bluetooth module (Step S106) and ends the sequence illustrated in FIG. 7.

When, as a result of the determination, an operation of turning the Bluetooth function ON has not been detected (No at Step S105), the controller 10 ends the sequence illustrated in FIG. 7. In the determination at Step S105, when an operation of turning the Bluetooth function ON has not been made in a certain time period after a switch-over of modes is performed, it is determined that the operation of turning the Bluetooth function ON has not been detected, and the sequence illustrated in FIG. 7 is ended. Or, when another operation is performed after a switch-over of modes is performed and before an operation of turning the Bluetooth function ON is performed, the sequence illustrated in FIG. 7 may be ended.

By using FIG. 8 and FIG. 9, one of examples of a procedural sequence executed by the mobile phone 20A and mobile phone 20B will be described.

Figure 8:
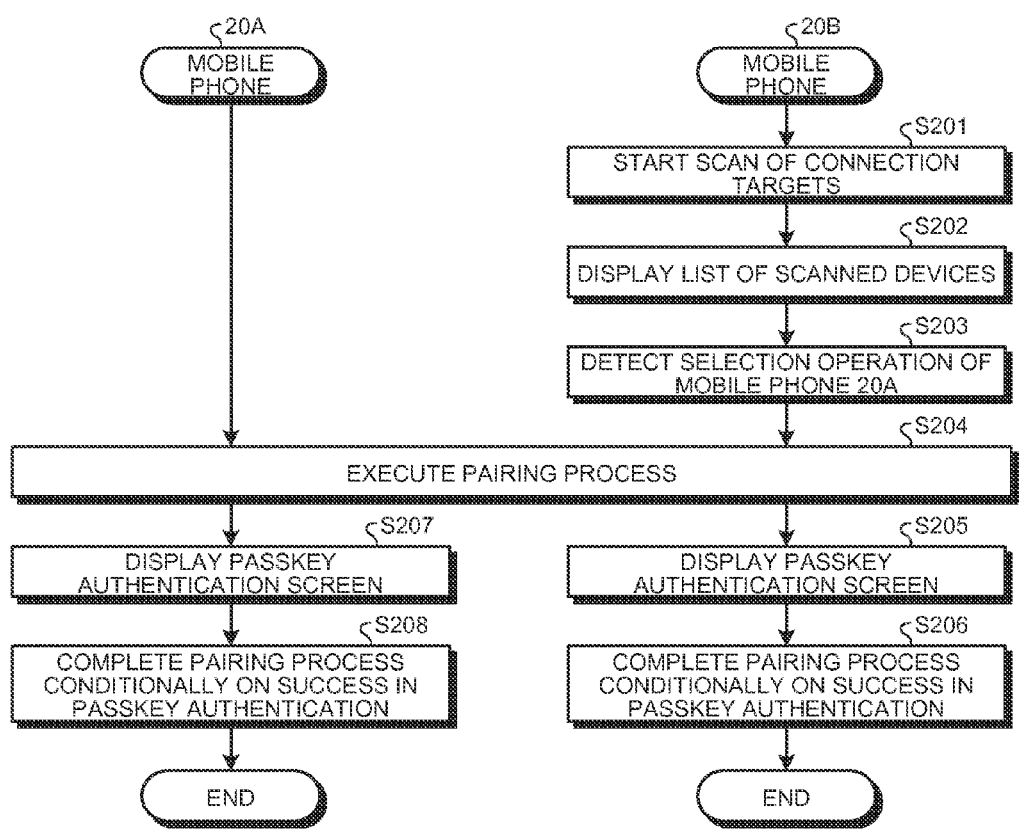
FIG. 8 is a diagram illustrating one of examples of a sequence in which two mobile phones are connected to each other after the switch-over of modes illustrated in FIG. 2 and FIG. 3 are performed.

FIG. 8 is a diagram illustrating a sequence in which, after the switch-over of modes illustrated in FIG. 2 and FIG. 3 is performed in the mobile phone 20A and mobile phone 20B, the two mobile phones are connected to each other. An example illustrated in FIG. 2 illustrates how the mode of the mobile phone 20A is switched over from the master mode to the slave mode, and an example illustrated in FIG. 3 illustrates how the mode of the mobile phone 20B is switched over from the slave mode to the master mode.

As a premise for execution of the sequence illustrated in FIG. 8, it is supposed that preprocessing for connecting to the mobile phone 20B has been done in the mobile phone 20A. For example, it is assumed that the mobile phone 20A has been subjected to a process for causing the mobile phone 20A to be scanned by the Bluetooth (registered trademark) function in the communication module 6b of the mobile phone 20B.

As illustrated in FIG. 8, the mobile phone 20B starts scan of connection targets (Step S201) and displays a list of devices that have been scanned (Step S202).

When a selection operation for the mobile phone 20A as a connection target is detected (Step S203), the mobile phone 20B executes a pairing process with the mobile phone 20A (Step S204).

When the pairing process is executed, the mobile phone 20B displays a passkey authentication screen (Step S205). The mobile phone 20B completes the pairing process (Step S206) conditionally on success in passkey authentication.

When the pairing process of the above described Step S204 is executed, the mobile phone 20A displays the passkey authentication screen (Step S207). The mobile phone 20A completes the paring process conditionally on success of passkey authentication (Step S208).

When the sequence illustrated in FIG. 8 is completed, the communication module 6b of the mobile phone 20A is wirelessly connected, in the slave mode, to the mobile phone 20B and the communication module 6b of the mobile phone 20B is wirelessly connected, in the master mode, to the mobile phone 20A (see FIG. 4). Thereafter, when the mobile phone 20B detects an incoming call, for example, the mobile phone 20B notifies the mobile phone 20A, which is the connected party thereof, of the incoming call via short distance wireless communication by the communication module 6b. When the incoming call is notified by the mobile phone 20B, the mobile phone 20A informs the user, of the incoming call, with a ringtone, vibration, blinking of a lamp, and/or the like.

Figure 9:
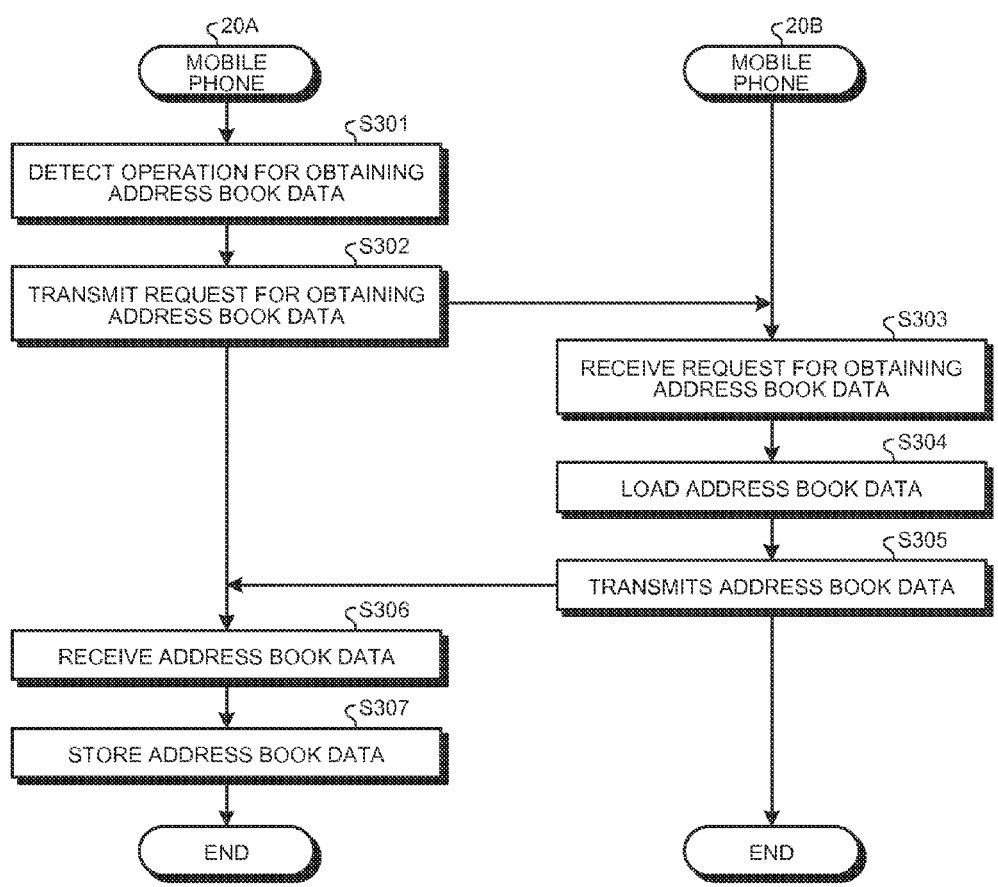
FIG. 9 is a diagram illustrating a sequence of obtaining address book data from another mobile phone.

FIG. 9 is a diagram illustrating one of examples of a sequence of obtaining address book data from another mobile phone. The mobile phone 20A is able to obtain address book data from the mobile phone 20B after wireless connection with the mobile phone 20B has been established as illustrated in FIG. 8, for example.

As illustrated in FIG. 9, when an operation for obtaining address book data is detected on a menu screen (see FIG. 2 or FIG. 3) that the display module 2 is caused to display (Step S301), the mobile phone 20A transmits a request for obtaining the address book data to the mobile phone 20B via short distance wireless communication by the communication module 6b (Step S302).

When the request for obtaining the address book data is received from the mobile phone 20A (Step S303), the mobile phone 20B loads the address book data (Step S304) and transmits the loaded address book data to the mobile phone 20A (Step S305).

When the address book data is received from the mobile phone 20B (Step S306), the mobile phone 20A stores the received address book data into the storage 9 (Step S307).

As described above, according to above embodiments, whether to use the mobile phone 20A and mobile phone 20B in any of the master mode and slave mode is able to be changed flexibly, and thus flexibility is able to be improved in a manner of use thereof.

In an embodiment, the mobile phone (mobile phone 20A or mobile phone 20B) may display a confirmation screen for confirming whether a function of the communication module 6b can be stopped when a mode switch-over operation is detected, for example. Hereinafter, the mobile phone 20A will be described as one of examples.

The control program 9A can provide a function for causing the display module 2 to display a confirmation screen for confirming permission for a switch-over of modes when a switch-over of modes between the master mode and slave mode is executed while the communication module 6b is in operation. The control program 9A can provide a function of causing the display module 2 to not display the confirmation screen when the switch-over of modes is executed while the communication module 6b is not in operation.

The control program 9A can provide a function for causing the display module 2 to display a confirmation screen for confirming permission on the switch-over of modes when the switch-over of modes between the master mode and slave mode is executed while another electronic device is connected to the communication module 6b. The control program 9A can provide a function of causing the display module 2 to not display the confirmation screen when the switch-over of modes is executed when another electronic device is not connected to the communication module 6b.

By executing the control program 9A, the controller 10 can cause the display module 2 to display the confirmation screen when the switch-over of modes is executed while the communication module 6b is in operation. In contrast, when the switch-over of modes is executed while the communication module 6b is not in operation, the controller 10 can cause the display module 2 to not display the confirmation screen.

By executing the control program 9A, the controller 10 can cause the display module 2 to display the confirmation screen when the switch-over of modes is executed while another electronic device is connected to the communication module 6b. In contrast, when the switchover of modes is executed while another electronic device is not connected to the communication module 6b, the controller 10 can cause the display module 2 to not display the confirmation screen.

Examples of another electronic device include, but are not limited to, a mobile phone, a headset, a personal computer, an audio set, etc. Examples of cases in which the communication module 6b is in operation include, but are not limited to, a case in which the Bluetooth (registered trademark) function is ON in the communication module 6b, etc. Examples of cases in which another electronic device is connected to the communication module 6b include a case in which another electronic device is wirelessly connected to the communication module 6b by the Bluetooth (registered trademark) function.

Figure 10:
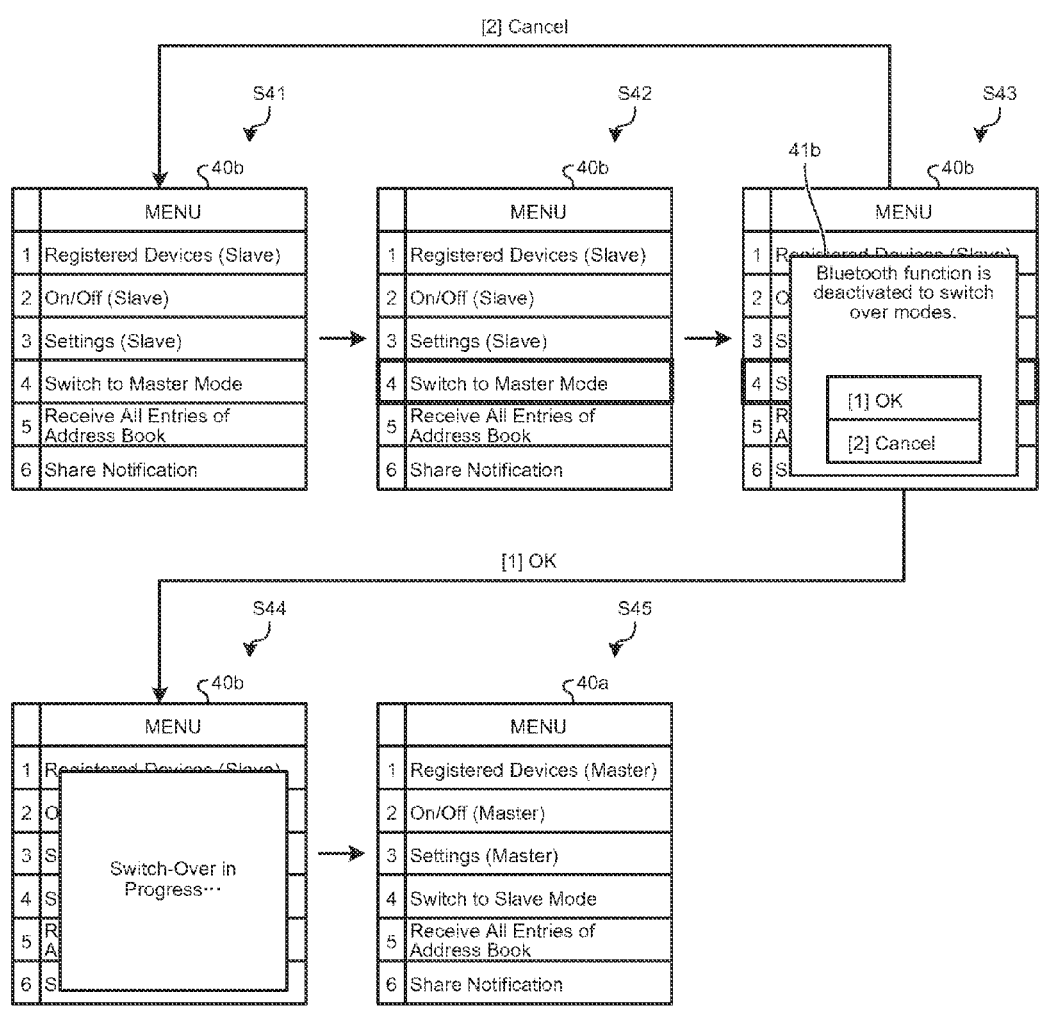
FIG. 10 is a diagram illustrating one of examples of control of when a switch-over of modes is executed while a communication module is in operation.
Figure 11:
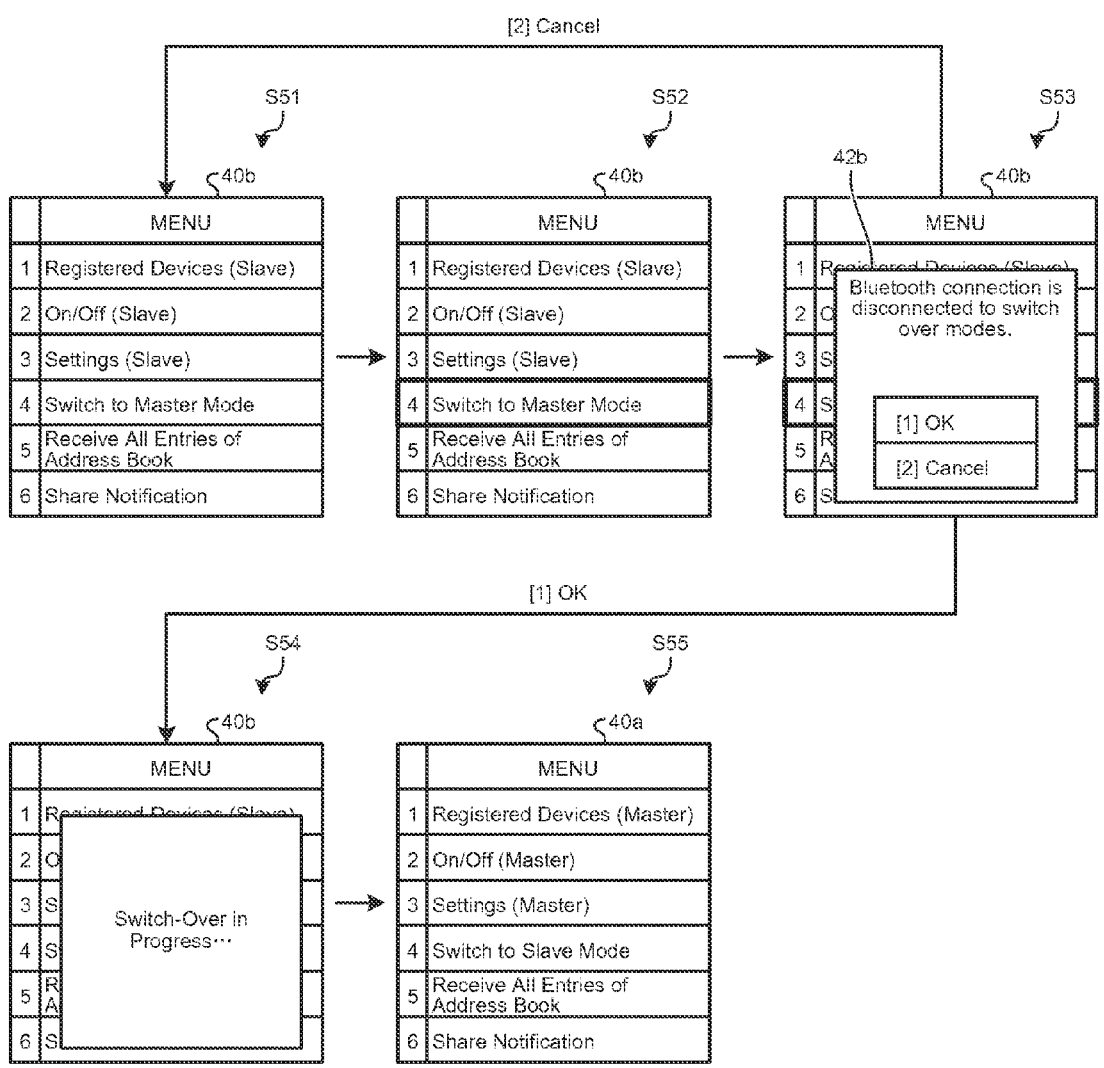
FIG. 11 is a diagram illustrating one of examples of control of when a switch-over of modes is executed while another electronic device is connected to the communication module.

By using FIG. 10 and FIG. 11, examples of control by a mobile phone according to an embodiment will be described. In FIG. 10 and FIG. 11, control of a switchover from the slave mode to the master mode in the mobile phone 20B (see FIG. 3) will be described. A switch-over from the master mode to the slave mode in the mobile phone 20A (see FIG. 2) may be realized by the similar control as FIG. 10 and FIG. 11.

FIG. 10 is a diagram illustrating one of examples of control of when the switch-over of modes is executed while the communication module 6b is in operation. As a premise for the control illustrated in FIG. 10, before the switch-over of modes is executed, the Bluetooth (registered trademark) function is assumed to be ON in the communication module 6b.

In response to an operation of a user, for example, the mobile phone 20B causes the display module 2 to display the menu screen 40b corresponding to the slave mode (Step S41).

Subsequently, when a switch-over operation to the master mode is detected on the menu screen 40b (Step S42), the mobile phone 20B displays a confirmation screen 41b for confirming with the user whether or not turning the Bluetooth function OFF and executing a switch-over of modes are to be permitted (Step S43).

When an operation (selection of "Cancel") for not permitting the switch-over of modes is detected on the confirmation screen 41b, the mobile phone 20B returns to Step S41.

When an operation (selection of "OK") for permitting the switch-over of modes is detected on the confirmation screen 41b, the mobile phone 20B executes the switch-over from the slave mode to the master mode (Step S44).

After the switch-over is completed, the mobile phone 20B displays the menu screen 40a corresponding to the master mode, on the display module 2 (Step S45).

FIG. 11 is a diagram illustrating one of examples of control of when a switch-over of modes is executed while another electronic device is connected to the communication module 6b. As a premise for the control illustrated in FIG. 11, it is assumed that before the switch-over of modes is executed, another electronic device (such as the mobile phone 20B) has been wirelessly connected to the communication module 6b, for example, by the Bluetooth (registered trademark) function.

The mobile phone 20B causes the display module 2 to display the menu screen 40b corresponding to the slave mode, in response to an operation of a user, for example (Step S51).

Subsequently, when a switch-over operation to the master mode is detected on a confirmation screen 42b (Step S52), the mobile phone 20B displays the confirmation screen 42b for confirming with the user whether or not disconnecting the Bluetooth connection and executing the switch-over of modes are to be permitted (Step S53). Thereby, disconnection, which is not intended by the user, of a connection is able to be prevented. In other words, disbenefit caused by misoperation is able to be reduced.

When an operation (selection of "Cancel") for not permitting the switch-over of modes is detected on the confirmation screen 42b, the mobile phone 20B returns to Step S51.

When an operation (selection of "OK") for permitting the switch-over of modes is detected on the menu screen 40b, the mobile phone 20B executes the switch-over from the slave mode to the master mode (Step S54).

After the switch-over is completed, the mobile phone 20B displays the menu screen 40a corresponding to the master mode, on the display module 2 (Step S55).

By using FIG. 12 and FIG. 13, examples of a procedural sequence executed by the mobile phone according to an embodiment will be described.

Figure 12:
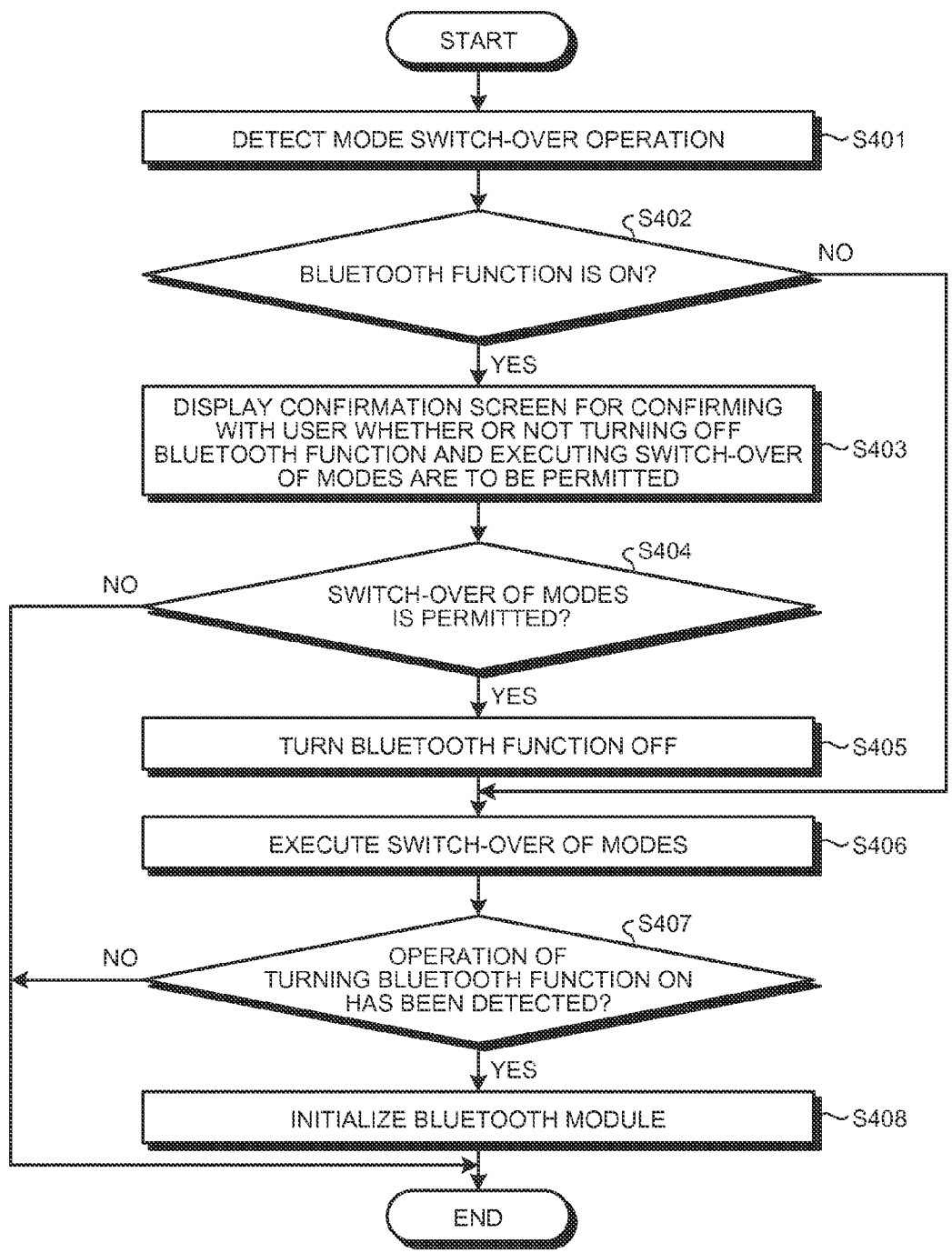

FIG. 12 is a flow chart illustrating one of examples of a switch-over sequence of when the Bluetooth (registered trademark) function is ON.

As illustrated in FIG. 12, when a mode switchover operation is detected (Step S401) on the menu screen (see FIG. 10) that the display module 2 is caused to display (Step S401), the controller 10 determines whether the Bluetooth function is ON in the communication module 6b (Step S402).

When, as a result of the determination, the Bluetooth function is ON (Yes at Step S402), the controller 10 displays a confirmation screen for confirming with a user whether or not turning the Bluetooth function OFF and executing the switch-over of modes are to be permitted (Step S403).

Subsequently, the controller 10 determines whether the switch-over of modes is permitted (Step S404).

That is, the controller 10 determines, whether an operation for permitting the switch-over of modes has been detected on the confirmation screen.

When, as a result of the determination, the switch-over of modes is permitted (Yes at Step S404), the controller 10 turns the Bluetooth function OFF (Step S405) and executes the switch-over of modes (Step S406).

Subsequently, the controller 10 determines whether an operation of turning the Bluetooth function ON has been detected on the menu screen (for example, see FIG. 10) (Step S407).

When, as a result of the determination, an operation of turning the Bluetooth function ON has been detected (Yes at Step S407), the controller 10 initializes the Bluetooth module of the communication module 6b (Step S408) and ends the sequence illustrated in FIG. 12.

In contrast, when, as a result of the determination, an operation of turning the Bluetooth function ON has not been detected (No at Step S407), the controller 10 directly ends the procedural sequence illustrated in FIG. 12. In the determination at Step S407, when an operation of turning the Bluetooth function ON has not been made in a certain time period after a switch-over of modes is executed, it is determined that an operation of turning the Bluetooth function ON has not been detected, and the sequence illustrated in FIG. 12 is ended. Or, when another operation is performed after a switch-over of modes is executed and before an operation of turning the Bluetooth function ON is performed, the sequence illustrated in FIG. 12 may be ended.

When, at Step S404, as a result of the determination, the switch-over of modes is not permitted (No at Step S404), the controller 10 ends the sequence illustrated in FIG. 12 without executing the switch-over of modes.

When, at Step S402, as a result of the determination, the Bluetooth function is not ON (No at Step S402), the controller 10 proceeds to the above described procedure at Step S406 and executes the switch-over of modes without causing the confirmation screen (see FIG. 10) to be displayed.

Figure 13:
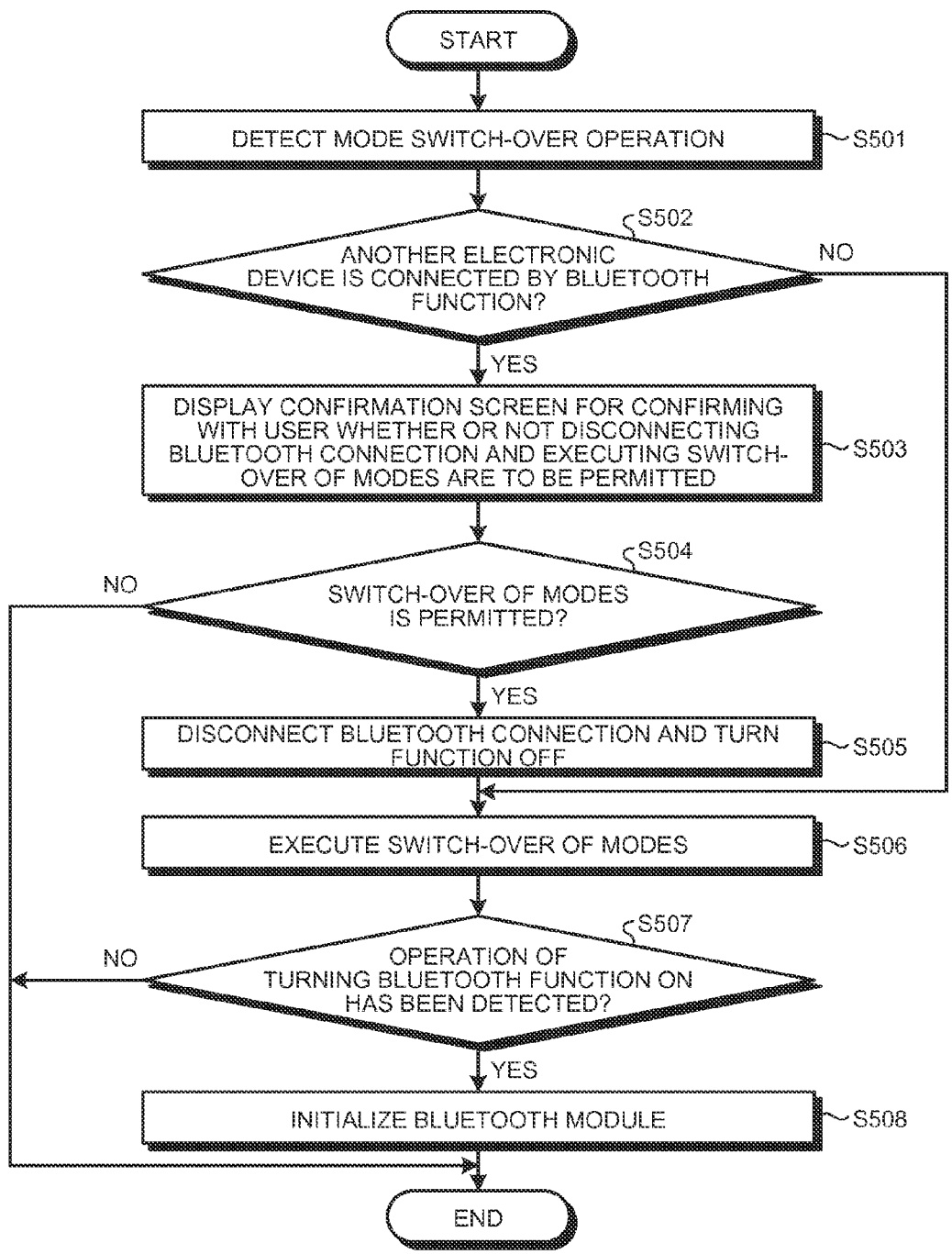
FIG. 13 is a flow chart illustrating one of examples of a switch-over sequence of when another electronic device is wirelessly connected to the communication module by the Bluetooth (registered trademark) function.

FIG. 13 is a flow chart illustrating one of examples of a switch-over sequence of when another electronic device is wirelessly connected to the communication module 6b by the Bluetooth (registered trademark) function.

As illustrated in FIG. 13, when a mode switch over operation is detected on the menu screen (see FIG. 11) that the display module 2 is caused to display (Step S501), the controller 10 determines whether another electronic device is connected to the communication module 6b by the Bluetooth function (Step S502).

When, as a result of the determination, another device is connected to the communication module 6b by the Bluetooth function (Yes at Step S502), the controller 10 displays a confirmation screen for confirming with the user whether or not disconnecting the Bluetooth connection and executing the switch-over of modes are to be permitted (Step S503).

Subsequently, the controller 10 determines whether the switch-over of modes is permitted (Step S504).

That is, the controller 10 determines whether an operation of permitting the switch-over of modes has been detected on the confirmation screen.

When, as a result of the determination, the switch-over of modes is permitted (Yes at Step S504), the controller 10 disconnects the Bluetooth connection, turns the Bluetooth function OFF (Step S505), and thereafter executes the switch-over of modes (Step S506).

Subsequently, the controller 10 determines whether an operation of turning the Bluetooth function ON has been detected on the menu screen (for example, see FIG. 11) (Step S507).

When, as a result of the determination, an operation of turning the Bluetooth function ON has been detected (Yes at Step S507), the controller 10 initializes the Bluetooth module of the communication module 6b (Step S508) and ends the sequence illustrated in FIG. 13.

In contrast, when, as a result of the determination, an operation of turning the Bluetooth function ON has not been detected (No at Step S507), the controller 10 directly ends the procedural sequence illustrated in FIG. 13. In the determination at Step S507, when an operation of turning the Bluetooth function ON has not been made in a certain time period after a switch-over of modes is performed, it is determined that an operation of turning the Bluetooth function ON has not been detected, and the sequence illustrated in FIG. 13 is ended. Or, when another operation is performed after a switch-over of modes is executed and before an operation of turning the Bluetooth function ON is performed, the sequence illustrated in FIG. 13 may be ended.

At Step S504, when, as a result of the determination, the switch-over of modes is not permitted (No at Step S504), the controller 10 ends the sequence illustrated in FIG. 13 without executing the switch-over of modes.

At Step S502, when, as a result of the determination, another electronic device is not connected to the communication module 6b by the Bluetooth function (No at Step S502), the controller 10 proceeds to the above described procedure at Step S506 and executes the switchover of modes, without causing the confirmation screen (see FIG. 11) to be displayed.

In some embodiments, if the Bluetooth function is ON when a switch-over operation is performed, the mobile phone 20A displays a confirmation screen for confirming with a user whether or not turning the Bluetooth function OFF and executing a switch-over of modes are to be permitted. Or, if another electronic device is connected to the communication module 6b by the Bluetooth function when a switch-over operation is performed, the mobile phone 20A displays a confirmation screen for confirming with a user whether or not disconnecting the Bluetooth connection and executing a switch-over of modes are to be permitted. As a result, according to above embodiments, disbenefit to a user caused by misoperation is able to be reduced.

In above embodiments, the mobile phone (mobile phone 20A or mobile phone 20B) may cause the display module to display a profile, which was used when the communication module 6b was wirelessly connected, in the slave mode, to another electronic device. For example, many profiles, implemented according to characteristics of electronic devices, are present for Bluetooth (registered trademark) used in connection among electronic devices. The mobile phone can cause the display module 2 to display a profile, which is using upon wireless connection to another electronic device to be displayed.

The control program 9A can provide a function of causing the display module 2 to display: an icon for identifying another electronic device wirelessly connected to the communication module 6b; and a profile used when the communication module 6b was wirelessly connected, in the slave mode, to another electronic device.

FIG. 14 and FIG. 15 are diagrams illustrating examples of the connectional data 9B according to an embodiment. As illustrated in FIG. 14 and FIG. 15, the connectional data 9B may include information on profiles in addition to the mode information, the device information, the type information for identifying the type of the electronic device, and the status information. The connectional data 9B can include, not only data based on a connection with another electronic device that is currently connected thereto. The connectional data 9B may include data based on a connection with another electronic device that has been connected thereto in the past.

By executing the control program 9A, the controller 10 can cause: an icon for identifying another electronic device wirelessly connected to the communication module 6b; and a profile used when the communication module 6b was wirelessly connected, in the slave mode, to another electronic device, to be displayed. By referring to the connectional data 9B stored in the storage 9, the controller 10 can cause the display module 2 to display the icon and the profile.

By referring FIG. 16 and FIG. 17, examples of control by a mobile phone according to an embodiment will be described.

Figure 16:
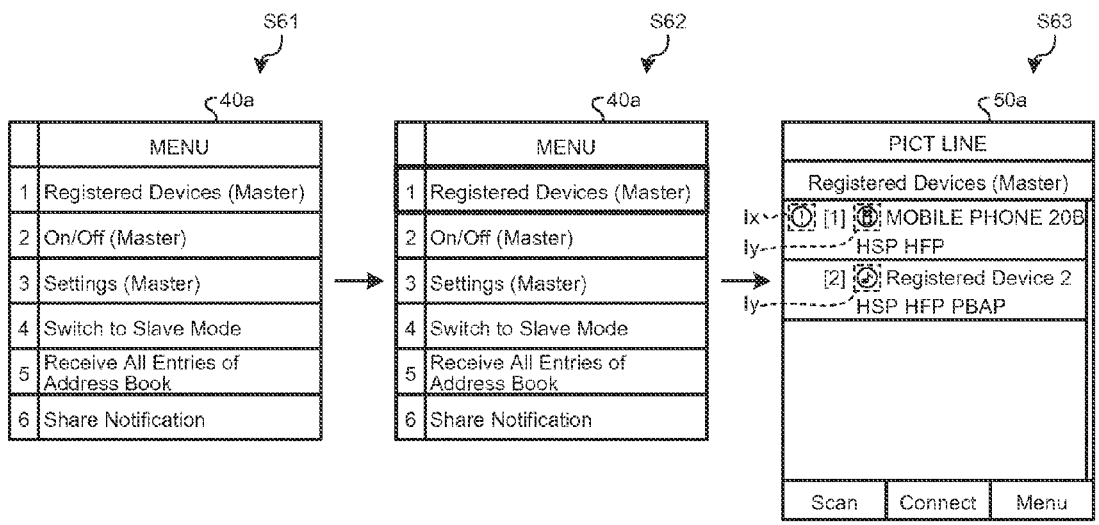
FIG. 16 is a diagram illustrating one of examples of control for displaying a list of registered devices in a master mode.

FIG. 16 is a diagram illustrating one of examples of control for displaying a list of registered devices in a master mode. As illustrated in FIG. 16, the mobile phone 20A causes the display module 2 to display the menu screen 40a corresponding to the master mode (Step S61).

Subsequently, when an operation of displaying a list of registered devices is detected on the menu screen 40a (Step S62), the mobile phone 20A causes the display module 2 to display a display screen 50a for the list of registered devices (Step S63).

On the display screen 50a for the list of registered devices, data based on a connection with the mobile phone 20B and data based on a connection with a registered device 2 may be displayed. The mobile phone 20B is an electronic device that is currently wireless connected to the mobile phone 20A that is set in the master mode. The registered device 2 is an electronic device that had been wirelessly connected thereto in the past. The data based on the connection with the mobile phone 20B may include an icon Ix indicating that the mobile phone 20B is wirelessly connected to the communication module 6b, an icon Iy for identifying a device type of the mobile phone 20B, and information on profiles (for example, HSP and HFP) common between the mobile phone 20A and the mobile phone 20B. Which profile of HSP and HFP may be used for the connection with the mobile phone 20B cannot be known from the information displayed on the mobile phone 20A. The data based on the connection with the registered device 2 may include an icon Iy for identifying a device type of the registered device 2 and information on profiles (for example, HSP, HFP, and PBAP) common between the mobile phone 20A and registered device 2.

Figure 17:
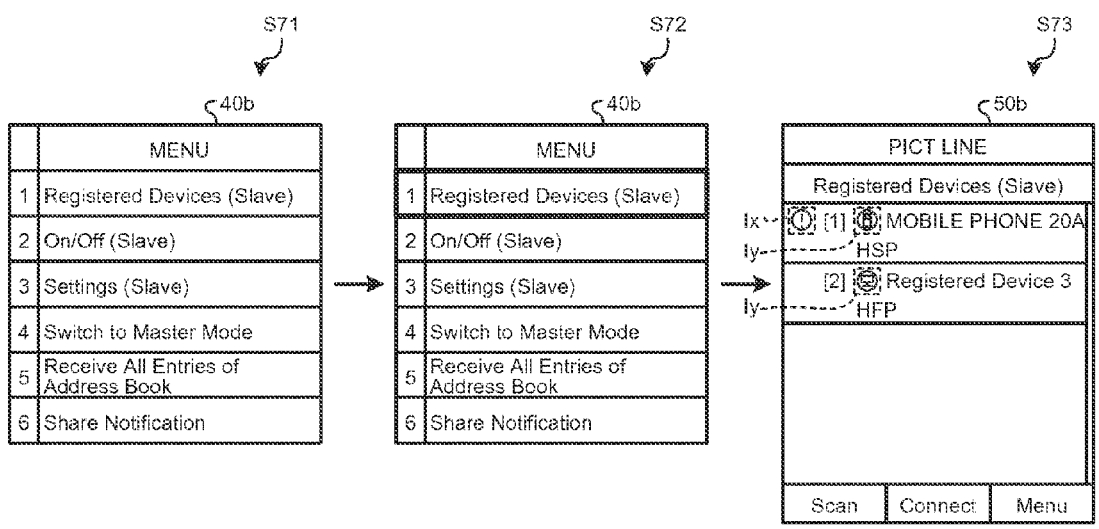
FIG. 17 is a diagram illustrating one of examples of control for displaying a list of registered devices in a slave mode.

FIG. 17 is a diagram illustrating one of examples of control of displaying a list of registered devices in the slave mode. As illustrated in FIG. 17, the mobile phone 20B may cause the display module 2 to display the menu screen 40b corresponding to the slave mode (Step S71).

Subsequently, when an operation of causing the list of registered devices to be displayed is detected on the menu screen 40b (Step S72), the mobile phone 20B causes the display module 2 to display a display screen 50b for the list of registered devices (Step S73).

On the display screen 50b for the list of registered devices, data based on a connection with the mobile phone 20A and data based on a connection with a registered device 3 may be displayed. The mobile phone 20A may be an electronic device that is currently wireless connected to the mobile phone 20B that is in the slave mode. The registered device 3 may be an electronic device that had been wirelessly connected thereto in the past. The data based on the connection with the mobile phone 20A may include the icon Ix indicating that the mobile phone 20A is wirelessly connected to the communication module 6b, an icon Iy for identifying a device type of the mobile phone 20A, and information on a profile (for example, HSP) used in the wireless connection between the mobile phone 20A and the mobile phone 20B. For example in step S73, the information being displayed on the mobile phone 20B tells that the connection with the mobile phone 20A is being achieved by using HSP. The data based on the connection with the registered device 3 may include the icon Iy for identifying a device type of the registered device 3 and information on a profile (for example, HFP) common between the mobile phone 20B and registered device 3.

Since the information being displayed on the mobile phone 20B tells that the connection with the mobile phone 20A is being achieved by using HSP, a user is able to recognize what kind of operation or manipulation is possible with the wirelessly connected mobile phone 20A. For example, when the wireless connection is achieved by using HFP, a response rejecting operation and a response holding operation for an incoming call notified from the mobile phone 20A in the master mode are able to be performed by the mobile phone 20B. Furthermore, transmission of a dual tone multi frequency (DTMF), and a call originating operation, are able to be performed from the mobile phone 20B in the slave mode to the mobile phone 20A in the master mode. Moreover, in the mobile phone 20B, ringing by a ringtone of the mobile phone 20A in the master mode is possible. In addition, a call ending operation of the mobile phone 20B in the slave mode is possible by using the mobile phone 20A in the master mode. When the wireless connection is being achieved by using HSP, such operation or manipulation is not possible.

Although the information on the profiles (HSP and HFP) common between the mobile phone 20A and mobile phone 20B is displayed in an example illustrated in FIG. 16, a profile being actually used in the wireless connection may be displayed to be recognizable.

Although the information on the profiles (HSP and HFP) common to the mobile phone 20A and mobile phone 20B is displayed in an example illustrated in FIG. 16, all of profiles implemented in the mobile phone 20A and profiles implemented in the mobile phone 20B may be displayed.

Although the information on the electronic device that had been wirelessly connected in the past is displayed in an examples illustrated in FIG. 16 and FIG. 17, only information on an electronic device that are currently connected may be displayed.

Although examples in which a mobile phone (mobile phone 20A or mobile phone 20B) is wirelessly connected to another electronic device in a one-to-one relation have been described in above embodiments, the mobile phone may be connected to a plurality of other electronic devices in a one-to-many relation.

Figure 18:
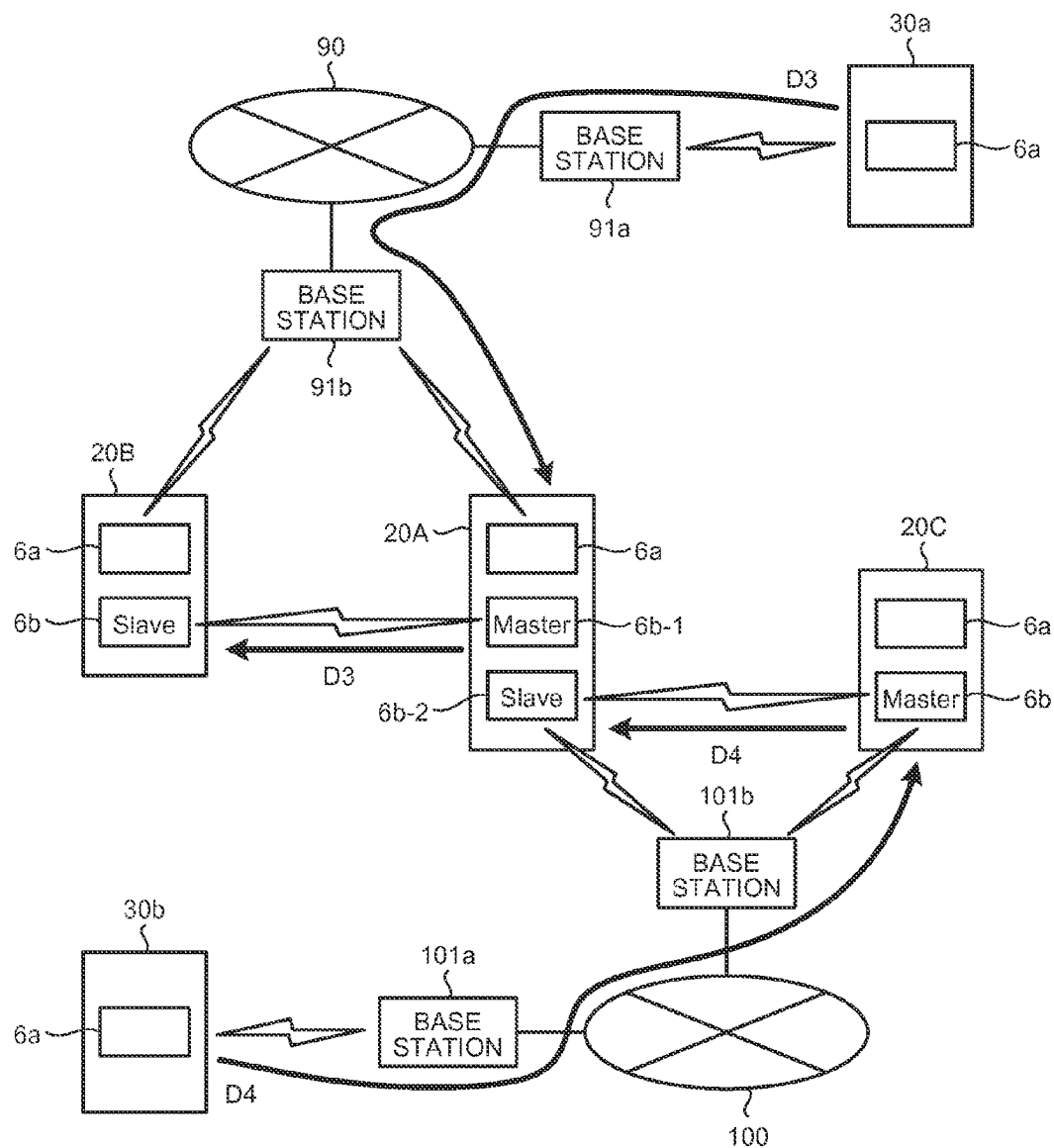
FIG. 18 is a diagram illustrating one of examples of a notification about an incoming call according to one of embodiments.
Figure 19:
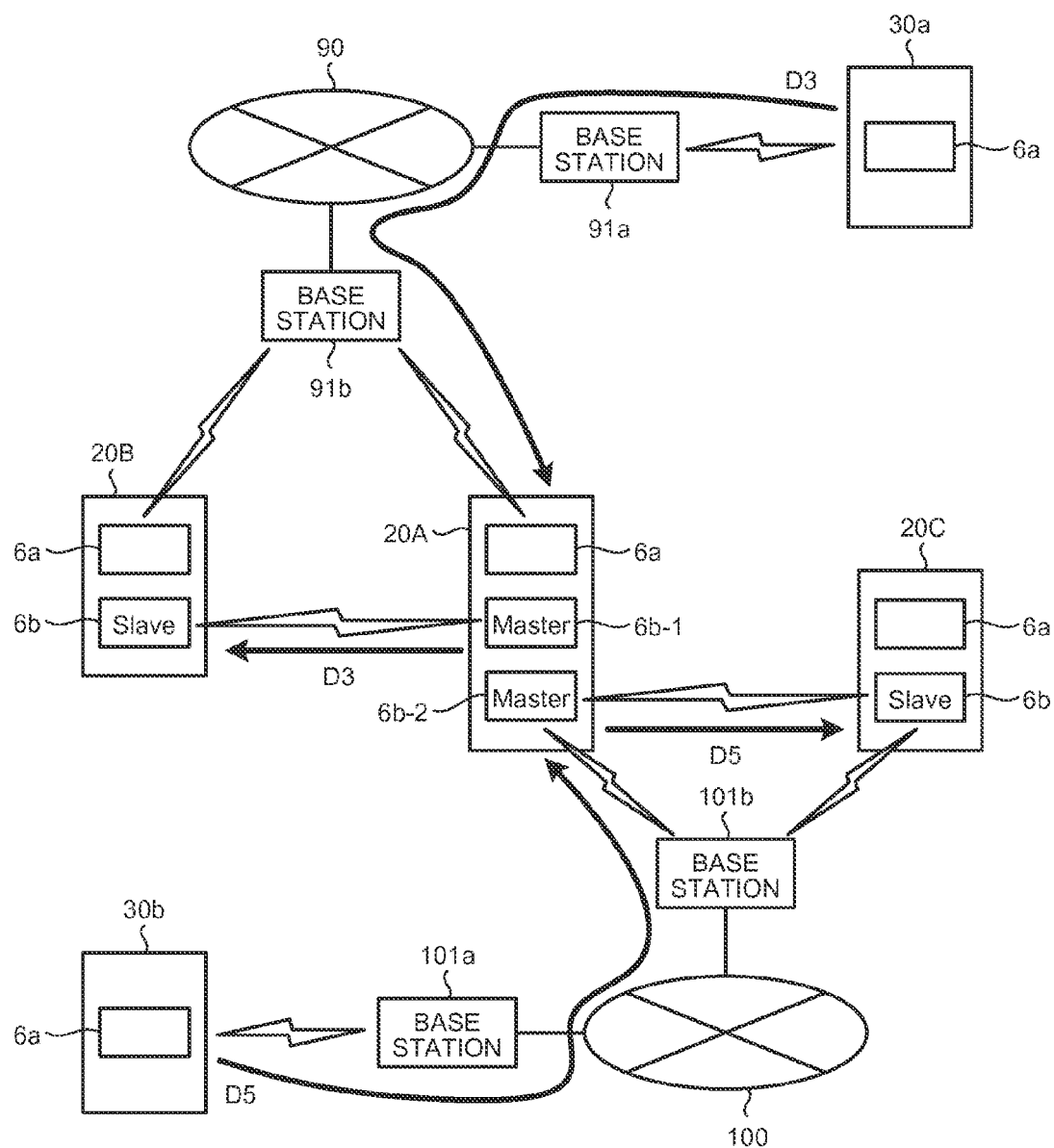
FIG. 19 is a diagram illustrating one of examples of notifications about incoming calls according to one of embodiments.
Figure 20:
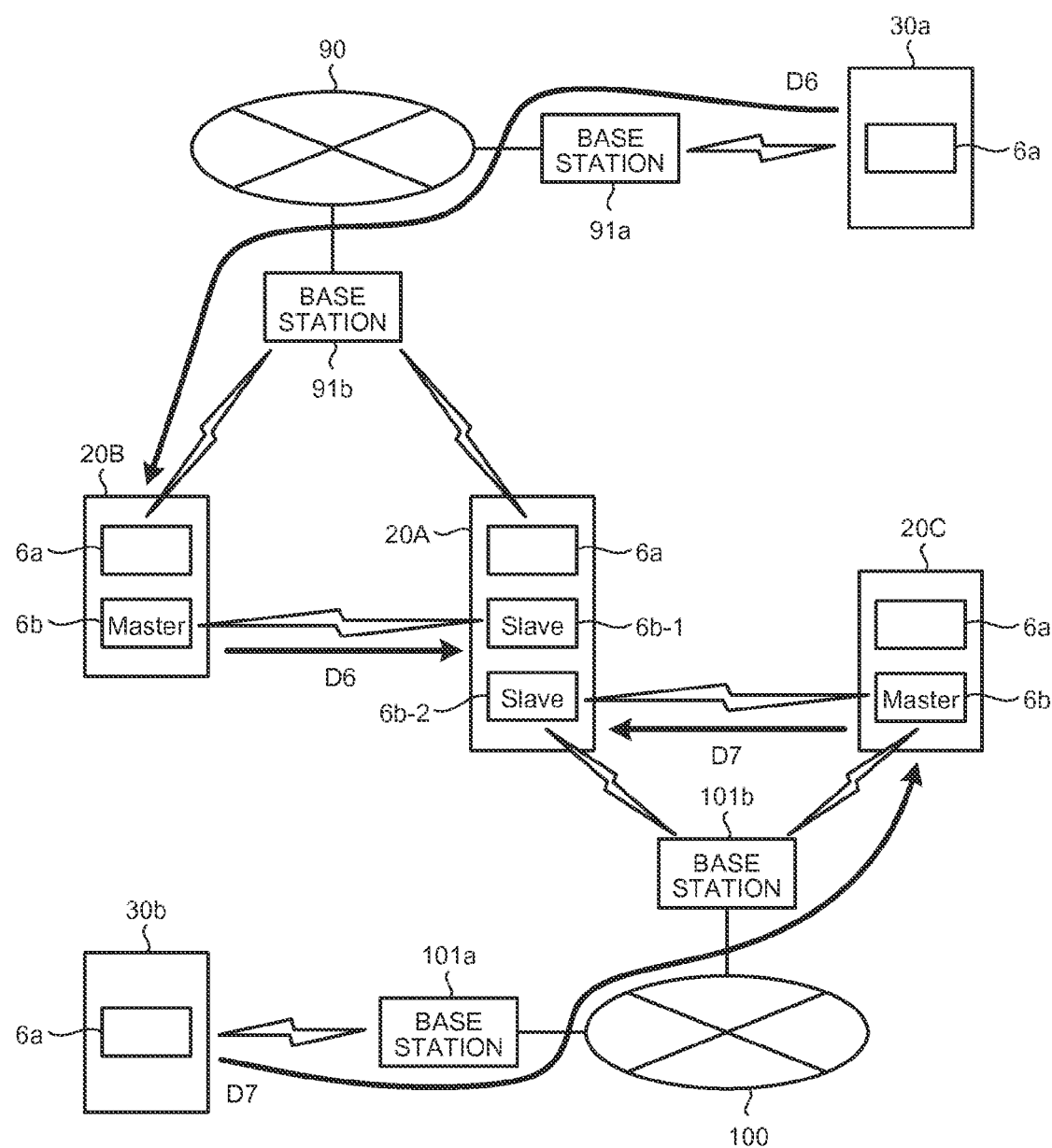
FIG. 20 is a diagram illustrating one of examples of notifications about incoming calls notifications according to one of embodiments.

With reference to FIG. 18 to FIG. 20, various control methods by a mobile phone according to embodiments will be described. FIG. 18 to FIG. 20 are diagrams illustrating examples of notifications about incoming calls according to embodiments. The mobile phones 20A and 20B, and mobile phones 20C, 30a, and 30b illustrated in FIG. 18 to FIG. 20 each may include the communication module 6a. The mobile phone 20A may further included communication modules 6b-1 and 6b-2. The mobile phones 20B and 20C each may further include the communication module 6b.

The communication module 6a is configured to be able to make a call through the public line network 90. In a setting illustrated in FIG. 18, the communication modules 6a of the mobile phones 20A and 20B are connected to the public line (carrier line) network 90 via wireless communication with the base station 91b. In a setting illustrated in FIG. 18, the communication module 6a of the mobile phone 30a is connected to the public line network 90 via wireless communication with the base station 91a. In a setting illustrated in FIG. 18, the communication modules 6a of the mobile phones 20A and 20C are connected to the public line (carrier line) network 100 via wireless communication with a base station 101b. In a setting illustrated in FIG. 18, the communication module 6a of the mobile phone 30b is connected to the public line network 100 via wireless communication with a base station 101a.

The communication modules 6b, 6b-1, and 6b-2 are configured to be able to make a call through short distance wireless communication, such as of Bluetooth (registered trademark). In a setting illustrated in FIG. 18, the communication module 6b-1 of the mobile phone 20A and the communication module 6b of the mobile phone 20B are wirelessly connected in a state communicatable with each other. The mobile phone 20A can cause the communication module 6b-1 to be wirelessly connected, in the master mode, to the mobile phone 20B, and the mobile phone 20B can cause the communication module 6b to be wirelessly connected, in the slave mode, to the mobile phone 20A. Further, in a setting illustrated in FIG. 18, the communication module 6b-2 of the mobile phone 20A and the communication module 6b of the mobile phone 20C are wirelessly connected in a state communicatable with each other. The mobile phone 20A can cause the communication module 6b-2 to be wirelessly connected, in the slave mode, to the mobile phone 20C, and the mobile phone 20C can cause the communication module 6b to be wirelessly connected, in the master mode, to the mobile phone 20A.

The mobile phones 20A, 20B, and 20C, are owned by, for example, the same user. When detecting an incoming call, the mobile phone 20A can notify the mobile phone 20B of the incoming call via short distance wireless communication by the communication module 6b-1. When detecting an incoming call, the mobile phone 20C can notify the mobile phone 20A of the incoming call via short distance wireless communication by the communication module 6b.

As illustrated in FIG. 18, when the mobile phone 30a originates a call to the mobile phone 20A, for example, this originated call may reach the mobile phone 20A via the base station 91a, the public line network 90, and the base station 91b. When the incoming call is detected, the mobile phone 20A can notify the mobile phone 20B connected thereto, of the incoming call, via short distance wireless communication by the communication module 6b-1. When the mobile phone 20B is notified of the incoming call by the mobile phone 20A, the mobile phone 20B can inform the user, of the incoming call, with a ringtone, vibration, blinking of a lamp, and/or the like.

When the user, who has noticed the information, performs an off-hook operation on the mobile phone 20A or mobile phone 20B, a call between the mobile phone 20A and mobile phone 30a is started in response to the off-hook operation. The off-hook operation is an operation for starting a call in response to an incoming call. When a response is made by an off-hook operation on the mobile phone 20B to an incoming call to the mobile phone 20A, the mobile phone 20A can relay voice data D3 exchanged with the mobile phone 30a to the mobile phone 20B while the call with the mobile phone 30a is being executed. When the call is disconnected by any of the mobile phone 20A, mobile phone 20B, and mobile phone 30a, the mobile phone 20A can end the exchange of the sound data D3 with the mobile phone 30a and end also the relay to the mobile phone 20B.

As illustrated in FIG. 18, when the mobile phone 30b originates a call to the mobile phone 20C, this originated call may reach the mobile phone 20C via the base station 101a, the public line network 100, and the base station 101b. When the incoming call is detected, the mobile phone 20C can notify the mobile phone 20A connected thereto, of the incoming call, via short distance wireless communication by the communication module 6b. When the mobile phone 20A is notified of the incoming call by the mobile phone 20C, the mobile phone 20A can inform the user, of the incoming call, with a ringtone, vibration, blinking of a lamp, and/or the like.

When the user, who has noticed the information, performs an off-hook operation on the mobile phone 20C or the mobile phone 20A, a call between the mobile phone 20C and the mobile phone 30b is started in response to the off-hook operation. The off-hook operation is an operation for starting a call in response to an incoming call. When a response is made by an off-hook operation on the mobile phone 20A to an incoming call to the mobile phone 20C, the mobile phone 20C can relay voice data D4 exchanged with the mobile phone 30b to the mobile phone 20A while the call with the mobile phone 30b is being executed. When the call is disconnected by any of the mobile phone 20C, mobile phone 20A, and mobile phone 30b, the mobile phone 20C can end the exchange of the voice data D4 with the mobile phone 30b and end the relay to the mobile phone 20A.

As described above, by individually establishing wireless connection with each of the mobile phone 20B and mobile phone 20C, the mobile phone 20A is able to receive voice data related to an incoming call notified by the mobile phone 20C from the mobile phone 20C, as well as being able to transfer voice data related to an incoming call to itself to the mobile phone 20B.

In a setting illustrated in FIG. 19, differently from the setting illustrated in FIG. 18, the mobile phone 20A can cause the communication module 6b-2 to be wirelessly connected, in the master mode, to the mobile phone 20C.

When detecting an incoming call, the mobile phone 20A can select whether to notify the mobile phone 20B of the incoming call via short distance wireless communication by the communication module 6b-1, or to notify the mobile phone 20C of the incoming call via short distance wireless communication by the communication module 6b-2. The mobile phone 20A may set beforehand which of the mobile phone 20B and mobile phone 20C to notify of an incoming call first, or may alternately change a destination to notify of the incoming call. When the mobile phone 20A is able to connect to a public line network via different paths, and an incoming call is received while the mobile phone 20A has notified any one of the mobile phone 20B and mobile phone 20C of another incoming call and has been in call already, the mobile phone 20A can notify the mobile phone, which has not been notified of the incoming call yet, of the incoming call.

In a case illustrated in FIG. 19, the mobile phone 20C is notified of an incoming call from the mobile phone 30b by the mobile phone 20A. When a response is made by an off-hook operation on the mobile phone 20C to the incoming call to the mobile phone 20A, voice data D5 exchanged between the mobile phone 30b and mobile phone 20A may be relayed to the mobile phone 20C from the mobile phone 20A.

In a setting illustrated in FIG. 20, differently from the setting illustrated in FIG. 18, the mobile phone 20A causes the communication module 6b-1 to wirelessly connect, in the slave mode, to the mobile phone 20B.

When detecting an incoming call, the mobile phone 20B can notify the mobile phone 20A of the incoming call via short distance wireless communication by the communication module 6b. When detecting an incoming call, the mobile phone 20C can notify the mobile phone 20A of the incoming call via short distance wireless communication by the communication module 6b. When the mobile phone 20A receives a notification about an incoming call from the mobile phone 20B and a notification about an incoming call from the mobile phone 20C at the same time, the mobile phone 20A may prioritize any of the notification about the incoming calls for informing, or may inform the user of both of the notification about the incoming calls and cause the user to make a selection. If another incoming call has already been received when an incoming call notified from the mobile phone 20B or mobile phone 20C is received, the mobile phone 20A may not accept the incoming call notified from the mobile phone 20B or mobile phone 20C. Or, even when the mobile phone 20A has already received another incoming call, the mobile phone 20A may receive the incoming call of the mobile phone 20B or mobile phone 20C once and transmit an instruction for transfer to a telephone answering service center or an instruction for receiving a message, to the mobile phone 20B or mobile phone 20C.

In a setting illustrated in FIG. 20, the mobile phone 20B can notify the mobile phone 20A of an incoming call from the mobile phone 30a. When the incoming call to the mobile phone 20B is responded by an off-hook operation of the mobile phone 20A, voice data D6 exchanged between the mobile phone 30a and mobile phone 20B may be relayed from the mobile phone 20B to the mobile phone 20A. The mobile phone 20C can notify the mobile phone 20A of an incoming call from the mobile phone 30b. When the incoming call to the mobile phone 20C is responded by an off-hook operation of the mobile phone 20A, voice data D7 exchanged between the mobile phone 30b and mobile phone 20C may be relayed from the mobile phone 20C to the mobile phone 20A.

FIG. 21 is a block diagram illustrating one of examples of a functional configuration of the mobile phone 20A according to one of embodiments. The functional configuration of the mobile phone 20A illustrated in FIG. 21 is different from above embodiments in the following described points.

As illustrated in FIG. 21, the mobile phone 20A has the communication modules 6b-1 and 6b-2.

The communication modules 6b-1 and 6b-2 are communication modules that perform communication by using short distance wireless communication. The communication modules 6b-1 and 6b-2 are also connecting modules that wireless connect or are wirelessly connected, to other electronic devices. Examples of the short distance wireless communication system include, but are not limited to, Bluetooth (registered trademark), wireless LAN (IEEE 802.11), ZigBee (registered trademark), infrared communication, visible light communication, near field communication (NFC), etc.

FIG. 22 to FIG. 24 are diagrams illustrating examples of information related to connection of the mobile phone 20A according to one of embodiments with other electronic devices.

FIG. 22 illustrates one of examples of the connectional data 9B in the mobile phone 20A corresponding to FIG. 18. As illustrated in FIG. 22, the connectional data 9B includes information related to connection to the mobile phone 20B and mobile phone 20C.

The connectional data 9B illustrated in FIG. 22 includes, as the information related to the connection to the mobile phone 20B: mode information, "master"; device information for identifying the mobile phone 20B to be connected to, "20B(00:11:22:AA:BB:CC)"; type information for identifying a type of the mobile phone 20B to be connected to, "TP1"; and status information for identifying a connection state to the mobile phone 20B, "connected". Further, the connectional data 9B illustrated in FIG. 22 includes, as the information related to the connection to the mobile phone 20C: mode information, "slave"; device information for identifying the mobile phone 20C to be connected to, "20C(01:12:23:AB:BC:CD)"; type information for identifying a type of the mobile phone 20C to be connected to, "TP1"; and status information for identifying a connection state to the mobile phone 20C, "connected".

The controller 10 controls, based on the connectional data 9B illustrated in FIG. 22, notification of an incoming call and response to the incoming call in a setting illustrated in FIG. 18.

FIG. 23 illustrates one of examples of the connectional data 9B in the mobile phone 20A corresponding to FIG. 19. As illustrated in FIG. 23, the connectional data 9B includes information related to connection to the mobile phone 20B and mobile phone 20C.

The connectional data 9B illustrated in FIG. 23 includes, as the information related to the connection to the mobile phone 20B: mode information, "master"; device information for identifying the mobile phone 20B to be connected to, "20B(00:11:22:AA:BB:CC)"; type information for identifying a type of the mobile phone 20B to be connected to, "TP1"; and status information for identifying a connection state to the mobile phone 20B, "connected". Further, the connectional data 9B illustrated in FIG. 23 includes, as the information related to the connection to the mobile phone 20C: mode information, "master"; device information for identifying the mobile phone 20C to be connected to, "20C(01:12:23:AB:BC:CD)"; type information for identifying a type of the mobile phone 20C to be connected to, "TP1"; and status information for identifying a connection state to the mobile phone 20C, "connected".

The controller 10 controls, based on the connectional data 9B illustrated in FIG. 23, notification of an incoming call and response to the incoming call in the case illustrated in FIG. 19.

FIG. 24 illustrates one of examples of the connectional data 9B in the mobile phone 20A corresponding to FIG. 20. As illustrated in FIG. 24, the connectional data 9B includes information related to connection to the mobile phone 20B and mobile phone 20C. The connectional data 9B illustrated in FIG. 24 includes, as the information related to the connection to the mobile phone 20B: mode information, "slave"; device information for identifying the mobile phone 20B to be connected to, "20B(00:11:22:AA:BB:CC)"; type information for identifying a type of the mobile phone 20B to be connected to, "TP1"; and status information for identifying a connection state to the mobile phone 20B, "connected". Further, the connectional data 9B illustrated in FIG. 24 includes, as the information related to the connection to the mobile phone 20C: mode information, "slave"; device information for identifying the mobile phone 20C to be connected to, "20C(01:12:23:AB:BC:CD)"; type information for identifying a type of the mobile phone 20C to be connected to, "TP1"; and status information for identifying a connection state to the mobile phone 20C, "connected".

The controller 10 controls, based on the connectional data 9B illustrated in FIG. 24, notification of an incoming call and response to the incoming call in a setting illustrated in FIG. 20.

In above embodiments, for example, various controls for establishing wireless connection between the mobile phone 20A and mobile phone 20B and executing notification of an incoming call by using the Bluetooth (registered trademark) function have been described, but embodiments are not limited thereto. For example, when wireless connection between the mobile phone 20A and mobile phone 20B is established by using, instead of the Bluetooth, wireless LAN (IEEE 802.11) or the like, controls that are the same as those of above embodiments are also applicable.

In embodiments, the wireless connections of the mobile phone 20A to the mobile phone 20B and mobile phone 20C may be changed.

For example, the control program 9A illustrated in FIG. 5, FIG. 21, and the like may be divided into a plurality of program modules. Or, the control program 9A illustrated in FIG. 5, FIG. 21, and the like may be combined with another program.

In above embodiments, a mobile phone has been described as one of examples of an electronic device according to the appended claims, but the electronic device according to the appended claims is not limited to a mobile phone. The electronic device according to the appended claims may be any electronic device other than a mobile phone, as long as it is a device capable of notification of an incoming call. Examples of the electronic device according to the appended claims include, but are not limited to, smartphones, PHSs, stationary telephones, facsimiles, personal computers installed with a modem, etc.

Although the art of appended claims has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

The invention claimed is:

1. An electronic device, comprising:
    a display module;
    a connecting module configured to wirelessly connect with a second device; and
    a controller configured to cause the connecting module to wirelessly connect with the second device in a first mode or in a second mode,
    wherein,
        in the first mode, the connecting module is configured to connect as a master with the second device,
        in the second mode, the connecting module is configured to connect as a slave with the second device, and
        the controller is configured to:
            cause the display module to display a confirmation screen when a switch-over between the first mode and the second mode is executed while the connecting module is in operation, wherein the confirmation screen is configured for confirming whether or not the switch-over of modes is to be permitted; and
            cause the display module to not display the confirmation screen when the switch-over is executed while the connecting module is not in operation.

2. The electronic device according to claim 1, wherein the controller is further configured to:
    transfer first voice data to the second device when the connecting module is connected in the first mode to the second device, wherein the connecting module is configured to receive the first voice data from a base station; and
    receive second voice data transferred from the second device when the connecting module is connected in the second mode to the second device.

3. The electronic device according to claim 1, wherein the display module is configured to display one of screens respectively corresponding to the first or second modes, and
    the controller is further configured to switch the screens according to the switch-over between the first mode and the second mode.

4. The electronic device according to claim 1, wherein the controller is further configured to cause the display module to display device information, and the device information identifies uniquely the second device slavery connected wirelessly.

5. The electronic device according to claim 4, wherein
    the controller is operable to support profiles,
    the connecting module is configured to connect to the second device using one of the profiles,
    the controller is further configured to cause the display module to further display one or more used profiles in addition to the device information, and
    the connecting module was wirelessly connected to the second device using each one of the used profiles.

6. A control method of controlling an electronic device including a display module and a connecting module configured to wirelessly connect to a second device, the control method comprising:
    causing the connecting module to wirelessly connect to the second device in a first mode or in a second mode;
    displaying on the display module, when a switch-over between the first mode and the second mode is executed while the connecting module is in operation, a confirmation screen for confirming whether or not the switch-over is to be permitted; and
    not displaying the confirmation screen on the display module when the switch-over is executed while the connecting module is not in operation, wherein
in the first mode, the connecting module is configured to wirelessly connect as a master to the second device, and
in the second mode, the connecting module is configured to connect as a slave to the second device.

7. The control method according to claim 6,
wherein the control method further comprises:
disconnecting a wireless connection to the second device; and
causing the display module to display device information, wherein the device information identifies the second device uniquely.

8. A control method according to claim 7, wherein the control method further comprises:
causing the display module to further display one or more used profiles in addition to the device information, wherein the connecting module was wirelessly connected to the second device using each one of the used profiles.

9. A non-transitory computer readable medium comprising a control program which, when executed by a processor, causes an electronic device including a display module and a connecting module configured to wirelessly connect to a second device to execute:
causing the connecting module to wirelessly connect to the second device in a first mode or in a second mode;
displaying on the display module of the electronic device, when a switch-over between the first mode and the second mode is executed while the connecting module is in operation, a confirmation screen for confirming whether or not the switch-over is to be permitted; and
not displaying the confirmation screen on the display module when the switch-over is executed while the connecting module is not in operation,
wherein
in the first mode, the connecting module is configured to connect as a master to the second device,
in the second mode, the connecting module is configured to connect as a slave to the second device.

10. The non-transitory computer readable medium according to claim 9,
wherein the control program further causes operable to causes the electronic device to further execute:
disconnecting a wireless connection to the second device; and
causing the display module to display device information, wherein the device information identifies the second device uniquely.

11. The non-transitory computer readable medium according to claim 10, wherein the control program further causes the electronic device to further execute:
causing the display module to further display one or more used profiles in addition to the device information, wherein the connecting module was wirelessly connected to the second device using each one of the used profiles.

12. An electronic device, comprising:
a first connecting module configured to wirelessly connect with a second device;
a second connecting module configured to wirelessly connect with a third device; and
a controller configured to:
cause the first connecting module to wirelessly connect with the second device as a master in a first mode of the first connecting module or as a slave in a second mode of the first connecting module,
cause the second connecting module to wirelessly connect with the third device as a master in a first mode of the second connecting module or as a slave in a second mode of the second connecting module,
cause the display module to display a confirmation screen when a switch-over between the first mode of the first connecting module and the second mode of the first connecting module is executed while the first connecting module is in operation, wherein the confirmation screen is configured for confirming whether or not the switch-over of modes is to be permitted, and
cause the display module to not display the confirmation screen when the switch-over is executed while the first connecting module is not in operation.

13. The electronic device according to claim 12, wherein the controller is configured to:
connect, when the first connecting module is connected with the second device in the first mode of the first connecting module, the second connecting module with the third device in the second mode of the second connecting module, and
connect, when the first connecting module is connected with the second device in the second mode of the first connecting module, the second connecting module with the third device in the first mode of the second connecting module.

* * * * *